(12) United States Patent
Cunningham et al.

(10) Patent No.: US 10,244,103 B2
(45) Date of Patent: Mar. 26, 2019

(54) METHODS, APPARATUSES, COMPUTER PROGRAM PRODUCTS AND SYSTEMS FOR COMPREHENSIVE AND UNIFIED CALL CENTER MONITORING

(71) Applicant: Red Box Recorders Limited, Nottinghamshire (GB)

(72) Inventors: John Cunningham, Saltby (GB); Stephen Parker, Leicestershire (GB)

(73) Assignee: RED BOX RECORDERS LIMITED., Nottinghamshire (GB)

( * ) Notice: Subject to any disclaimer, the term of this patent is extended or adjusted under 35 U.S.C. 154(b) by 0 days.

(21) Appl. No.: 15/974,062

(22) Filed: May 8, 2018

(65) Prior Publication Data

US 2018/0332165 A1 Nov. 15, 2018

Related U.S. Application Data

(60) Provisional application No. 62/503,167, filed on May 8, 2017.

(51) Int. Cl.
*H04M 3/22* (2006.01)
*H04M 3/51* (2006.01)
*H04M 3/42* (2006.01)
*H04L 29/06* (2006.01)

(52) U.S. Cl.
CPC .......... *H04M 3/2236* (2013.01); *H04L 65/80* (2013.01); *H04M 3/42221* (2013.01); *H04M 3/5175* (2013.01); *H04M 2201/40* (2013.01); *H04M 2201/42* (2013.01); *H04M 2201/60* (2013.01); *H04M 2203/301* (2013.01); *H04M 2203/55* (2013.01)

(58) Field of Classification Search
CPC ............ H04M 3/22; H04M 3/51; H04M 3/42; H04M 3/5175; H04L 29/06
USPC ............ 379/32.01, 35, 32.02, 32.04, 265.06, 379/265.01
See application file for complete search history.

(56) References Cited

U.S. PATENT DOCUMENTS

| 6,707,904 B1 * | 3/2004 | Judkins .................. H04M 3/51 379/265.06 |
| 2012/0271942 A1 * | 10/2012 | Walker .................. H04L 41/069 709/224 |
| 2013/0083903 A1 * | 4/2013 | Peterson ............. H04M 3/5175 379/88.08 |

* cited by examiner

*Primary Examiner* — Melur Ramakrishnaiah
(74) *Attorney, Agent, or Firm* — Katten Muchin Rosenman LLP

(57) ABSTRACT

An apparatus monitoring calls of a system includes a processor and memory causing the apparatus to perform operations including capturing recordings of calls in real-time from recorded devices. The processor may further cause the apparatus to compare audio call data of the calls detected by a switch with audio content of recorded calls by recorder devices to determine whether the audio call data matches the audio content of recorded calls. The processor may further cause the apparatus to monitor conditions of recorder devices during calls to determine whether a component(s) of recorder devices or of communication devices exceeds a threshold. The processor may further cause the apparatus to monitor memory in which recorded calls are transferred for archiving to determine whether there is enough storage in the memory. The processor may further cause the apparatus to determine metrics impacting quality of recorded calls and perform analytics on the recorded calls.

30 Claims, 26 Drawing Sheets

METHODS, APPARATUSES, COMPUTER PROGRAM PRODUCTS AND SYSTEMS FOR COMPREHENSIVE AND UNIFIED CALL CENTER MONITORING

CROSS-REFERENCE TO RELATED APPLICATIONS

This application is a non-provisional of provisional U.S. Application No. 62/503,167, filed May 8, 2017, the contents of which are hereby incorporated herein in its entirety by reference.

TECHNOLOGICAL FIELD

An example embodiment of the invention relates generally to telephone call management technology and, more particularly, relates to call center management technology and methods, apparatuses, computer program products and systems for monitoring various stages of one or more calls, transcribing calls as well as generating analytics pertaining to the calls.

BACKGROUND

Various methods, apparatuses, and systems are configured to monitor various stages of one or more calls, transcribe calls and generate analytics pertaining to the calls. Applicant has identified many deficiencies and problems associated with existing methods, apparatuses and systems. Through applied effort, ingenuity, and innovation, these identified deficiencies and problems have been solved by developing solutions that are in accordance with the embodiments of the present invention, many examples of which are described in detail herein.

BRIEF SUMMARY

In general, exemplary embodiments of the present invention provide methods, apparatuses, systems, computing devices, and/or the like for monitoring various stages of one or more calls, transcribing calls and generating analytics pertaining to the calls.

The exemplary embodiments also provide end to end monitoring, remedial recommendations and general analysis of: voice and data network health, application health, policy and threshold adherence, captured audio quality and spoken words across multiple recording platforms.

In one example embodiment, a method for monitoring one or more calls of a system is provided. The method may include capturing one or more recordings of telephone calls in real-time from corresponding recorder devices of communication devices. The method may further include comparing items of audio call data of the telephone calls detected by a switch with the audio content of the recorded telephone calls recorded by one or more of the recorder devices to determine whether the audio call data matches the audio content of the recorded telephone calls. The method may further include monitoring one or more conditions of the recorder devices during the respective calls to determine whether at least one component of the recorder devices or at least one other component of the communication devices exceeds a predetermined threshold. The method may further include monitoring at least one memory device in which the recorded telephone calls are being transferred for permanent archiving to determine whether there is enough storage space in the memory device to store the recorded telephone calls. The method may further include determining a plurality of quality metrics impacting quality of the recorded telephone calls. The method may further include performing a plurality of analytics on the recorded telephone calls.

In another example embodiment, an apparatus for monitoring one or more calls of a system is provided. The apparatus may include a processor and a memory including computer program code. The memory and computer program code are configured to, with the processor, cause the apparatus to at least perform operations including capturing one or more recordings of telephone calls in real-time from corresponding recorder devices of communication devices. The at least one memory and the computer program code are further configured to, with the processor, cause the apparatus to compare items of audio call data of the telephone calls detected by a switch with the audio content of the recorded telephone calls recorded by one or more of the recorder devices to determine whether the audio call data matches the audio content of the recorded telephone calls. The at least one memory and the computer program code are further configured to, with the processor, cause the apparatus to monitor one or more conditions of the recorder devices during the respective calls to determine whether at least one component of the recorder devices or at least one other component of the communication devices exceeds a predetermined threshold. The at least one memory and the computer program code are further configured to, with the processor, cause the apparatus to monitor the memory in which the recorded telephone calls are being transferred for permanent archiving to determine whether there is enough storage space in the memory to store the recorded telephone calls. The at least one memory and the computer program code are further configured to, with the processor, cause the apparatus to determine a plurality of quality metrics impacting quality of the recorded telephone calls. The at least one memory and the computer program code are further configured to, with the processor, cause the apparatus to perform a plurality of analytics on the recorded telephone calls.

In yet another example embodiment, a computer program product for monitoring one or more calls of a system is provided. The computer program product includes at least one computer-readable storage medium having computer-executable program code portions stored therein. The computer-executable program code instructions may include program code instructions configured to capture one or more recordings of telephone calls in real-time from corresponding recorder devices of communication devices. The program code instructions may also be configured to compare items of audio call data of the telephone calls detected by a switch with the audio content of the recorded telephone calls recorded by one or more of the recorder devices to determine whether the audio call data matches the audio content of the recorded telephone calls. The program code instructions may also be configured to monitor one or more conditions of the recorder devices during the respective calls to determine whether at least one component of the recorder devices or at least one other component of the communication devices exceeds a predetermined threshold. The program code instructions may also be configured to monitor a memory of a network device in which the recorded telephone calls are being transferred for permanent archiving to determine whether there is enough storage space in the memory to store the recorded telephone calls. The program code instructions may also be configured to determine a plurality of quality metrics impacting quality of the recorded telephone calls.

The program code instructions may also be configured to perform a plurality of analytics on the recorded telephone calls.

BRIEF DESCRIPTION OF THE SEVERAL VIEWS OF THE DRAWINGS

Figure 1:
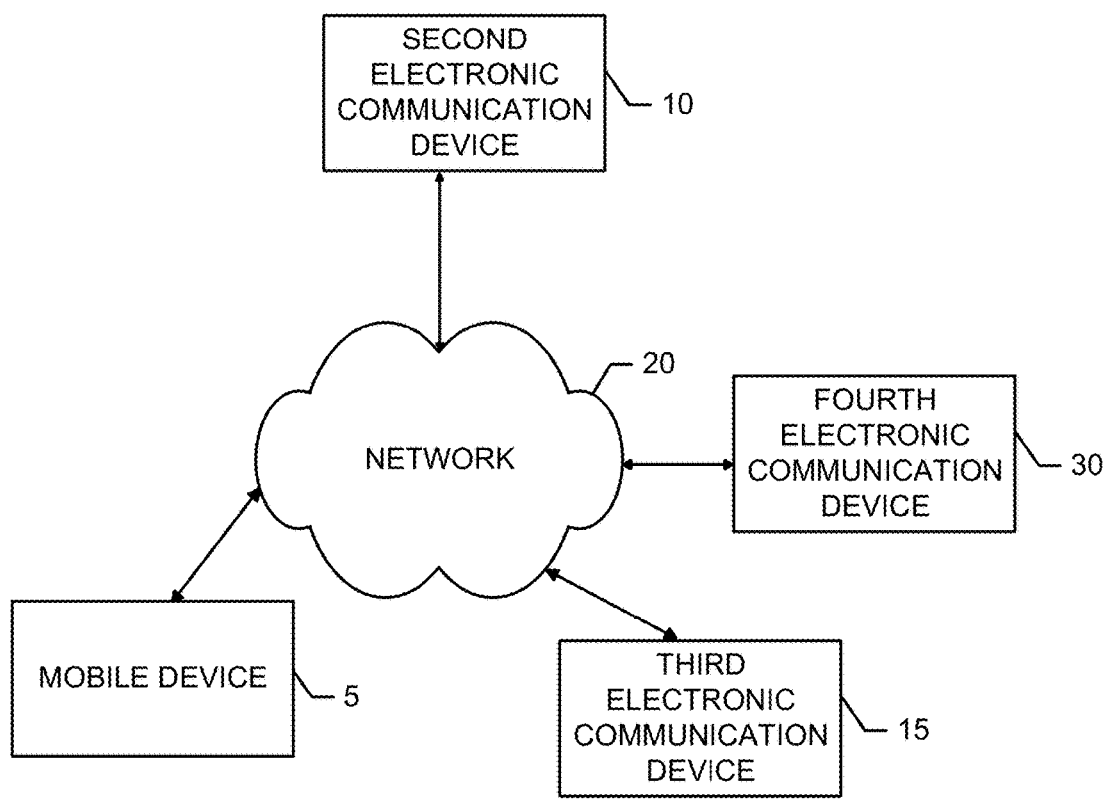
Figure 2:
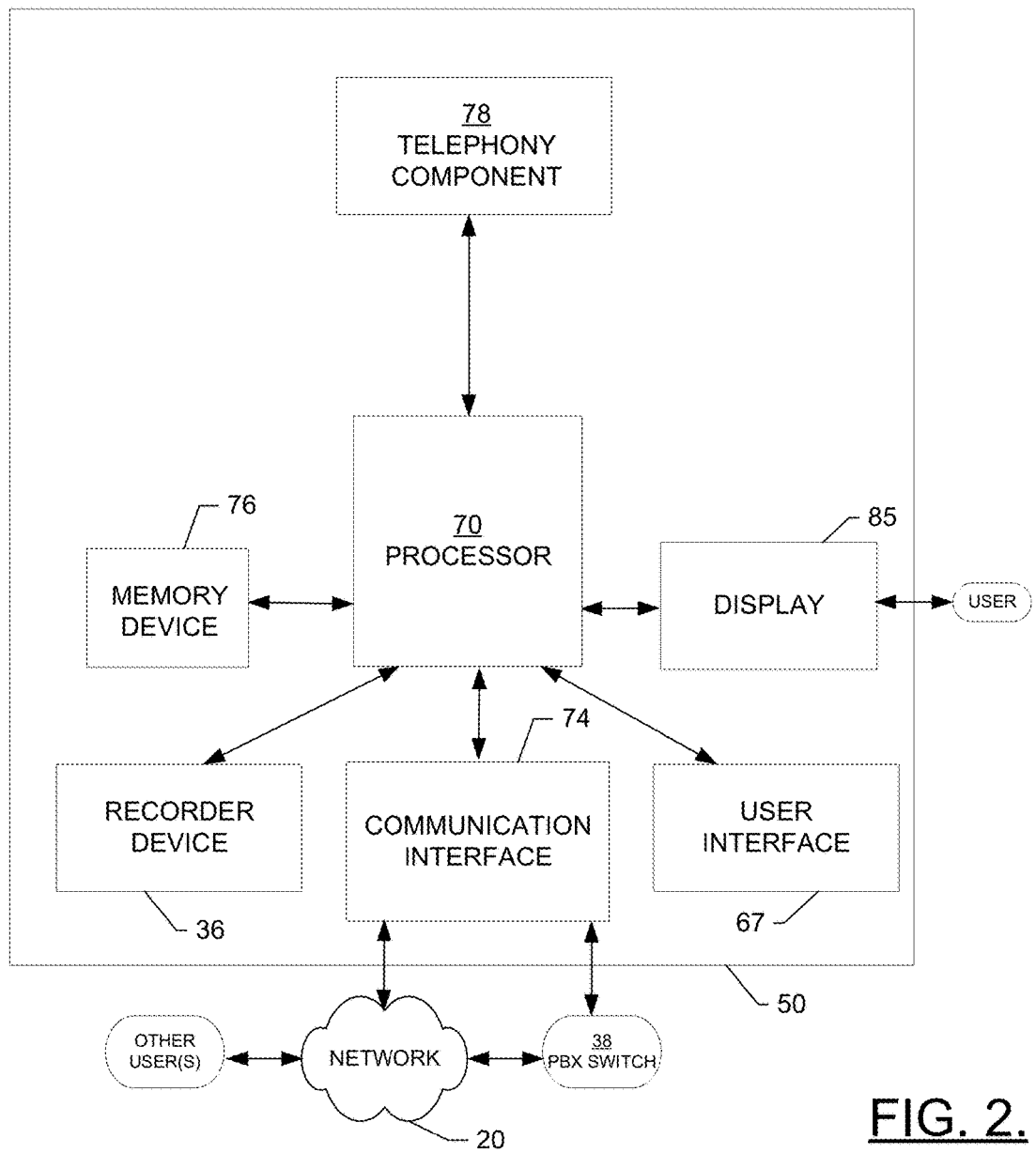
Figure 3:
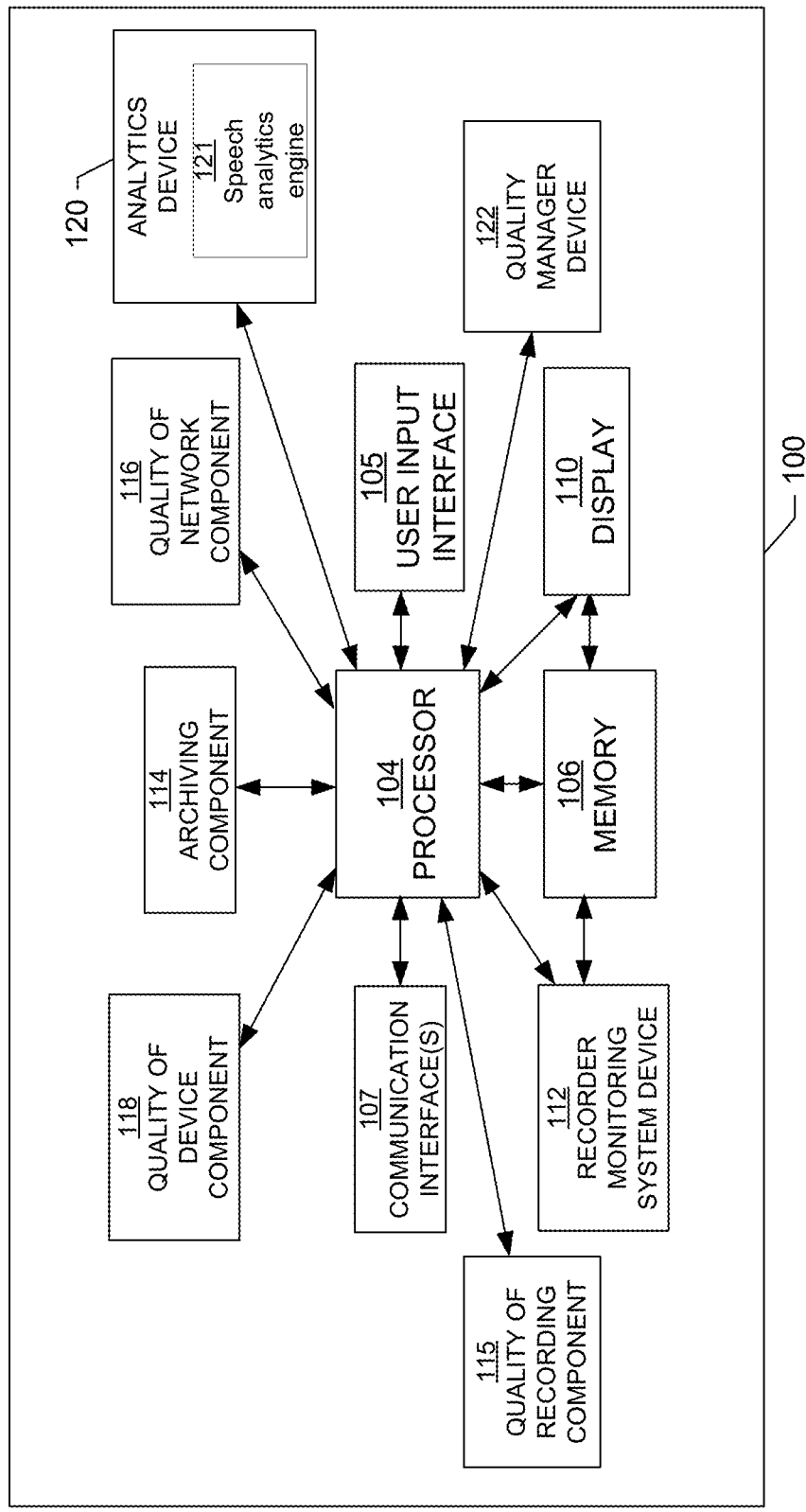
Figure 4:
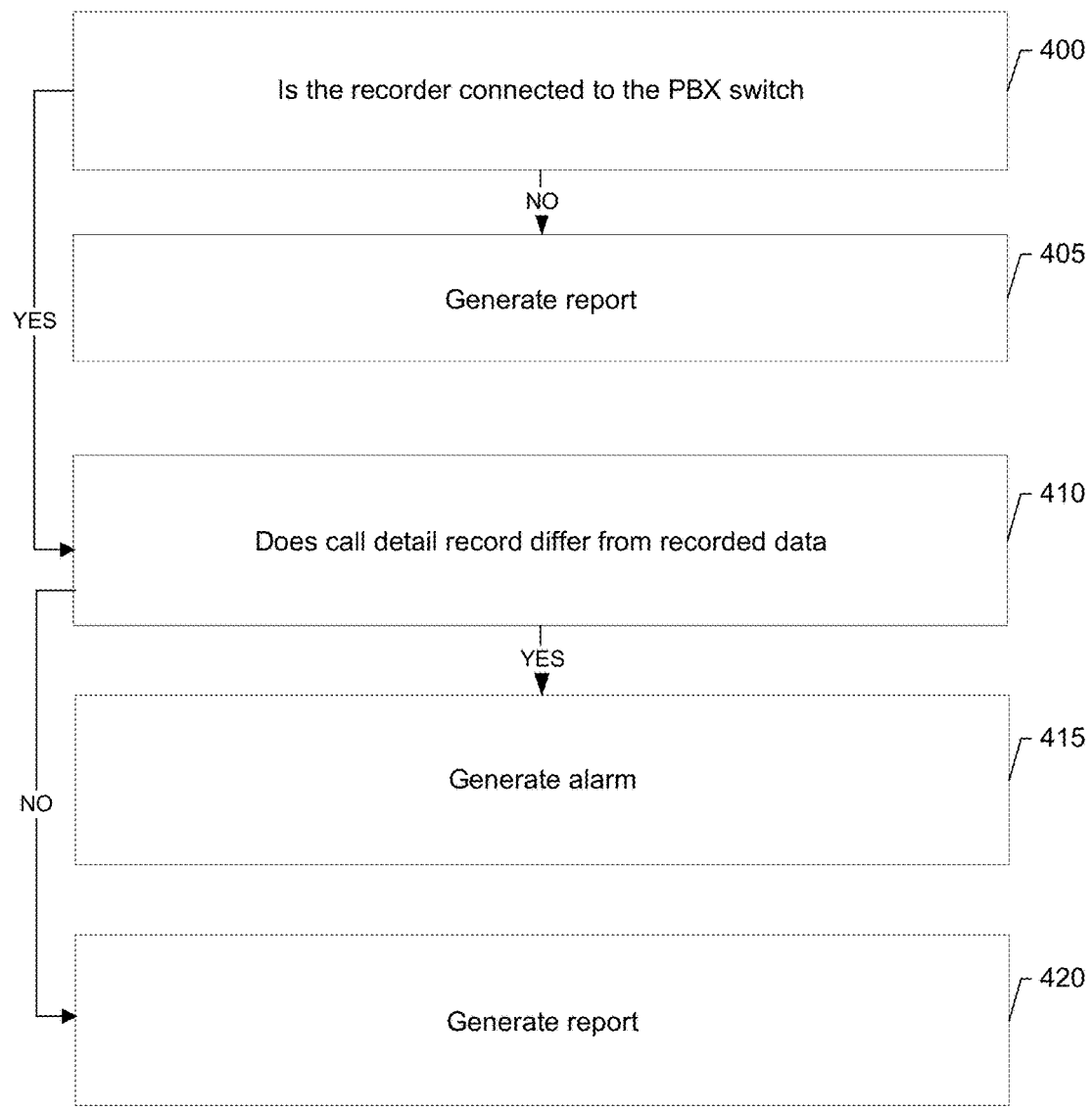
Figure 5:
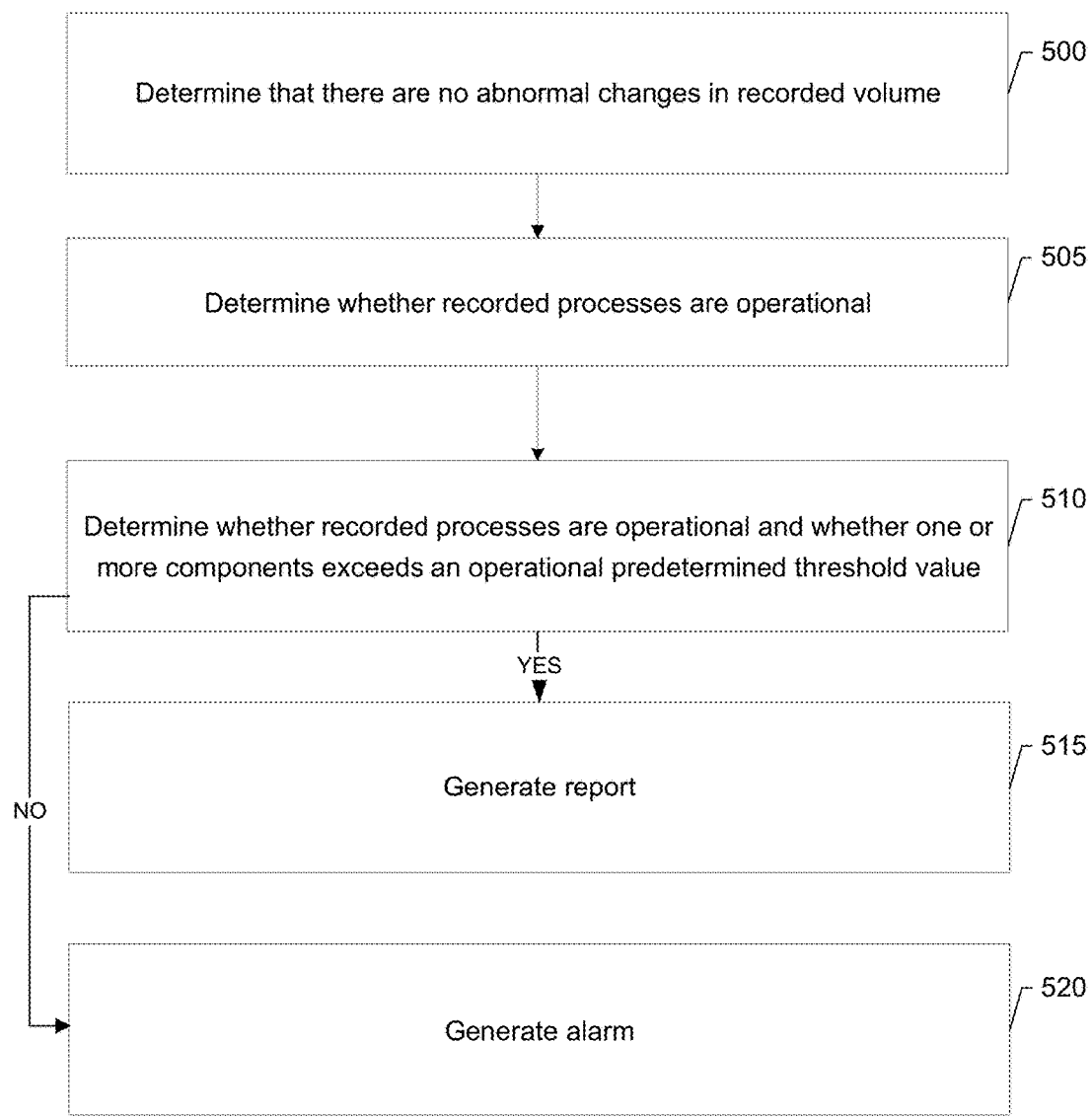
Figure 6:
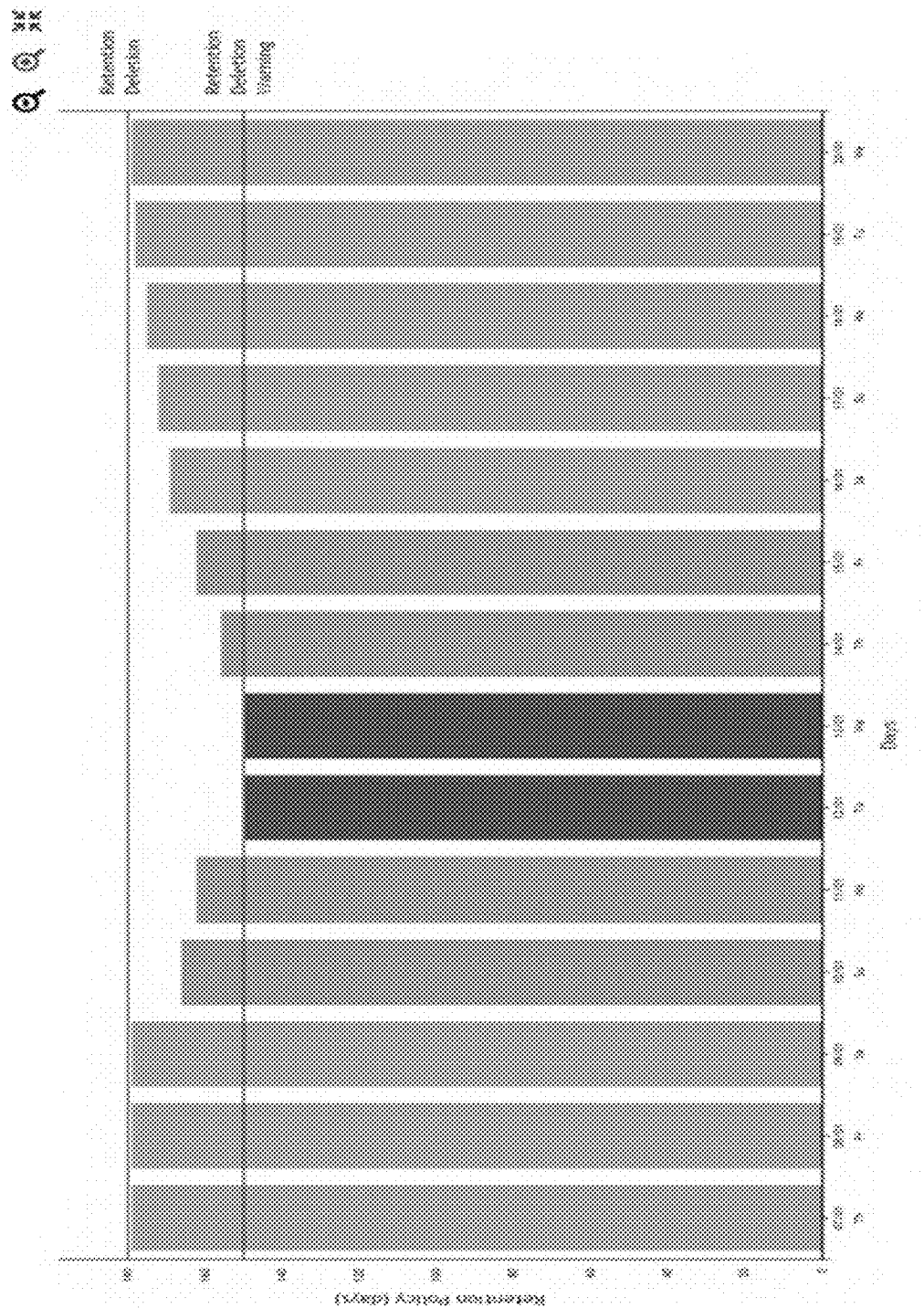
Figure 7:
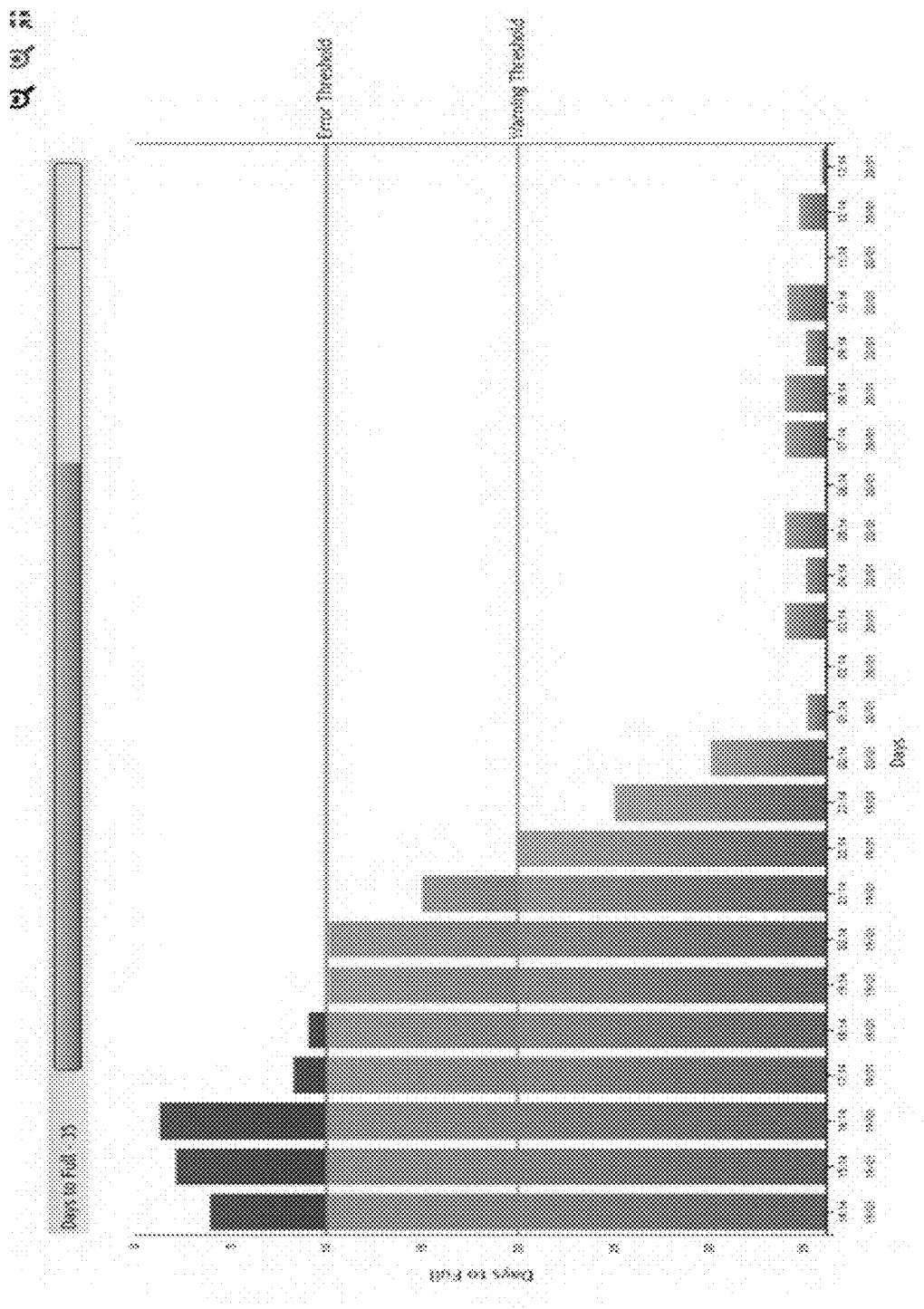
Figure 8:
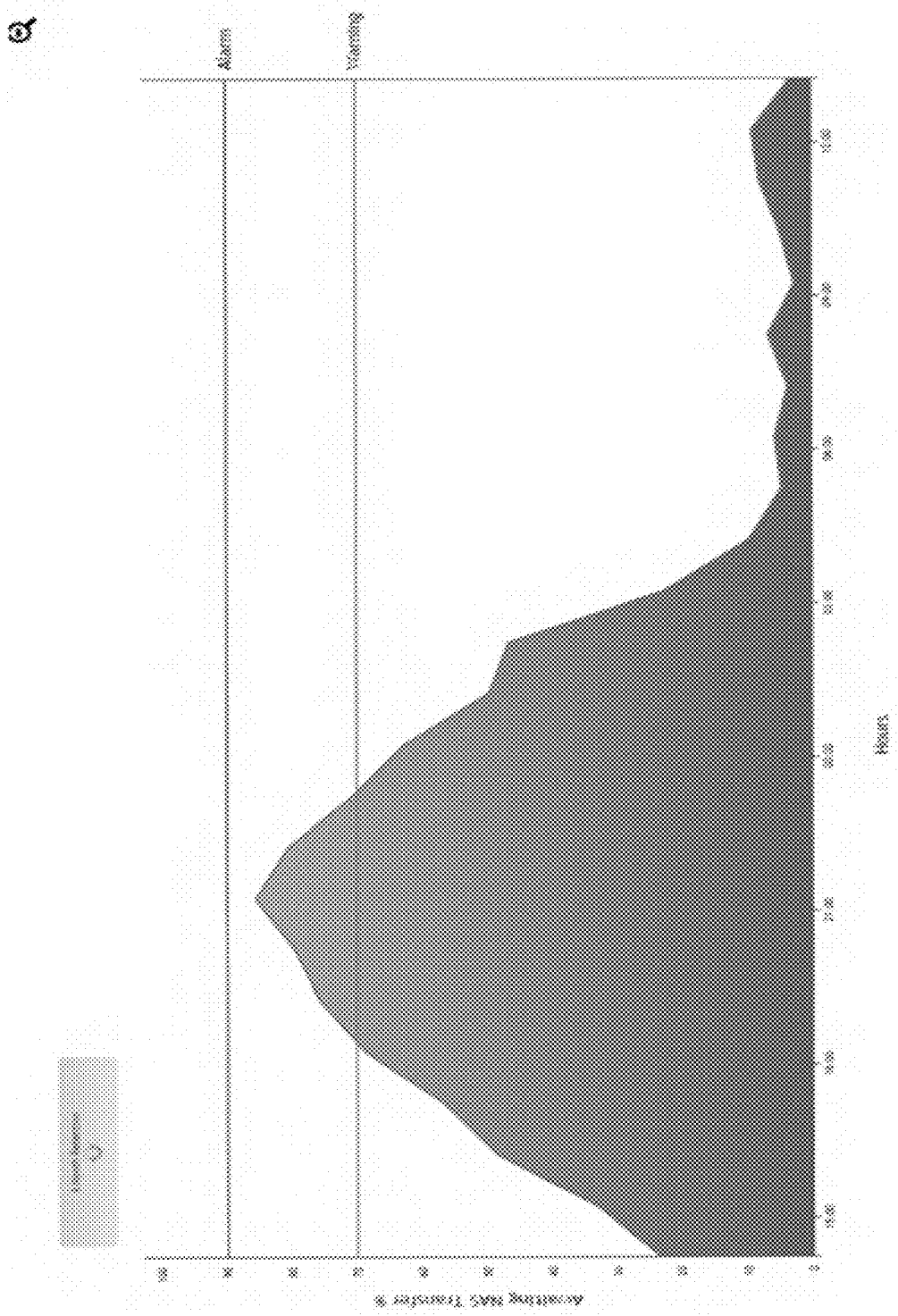
Figure 9:
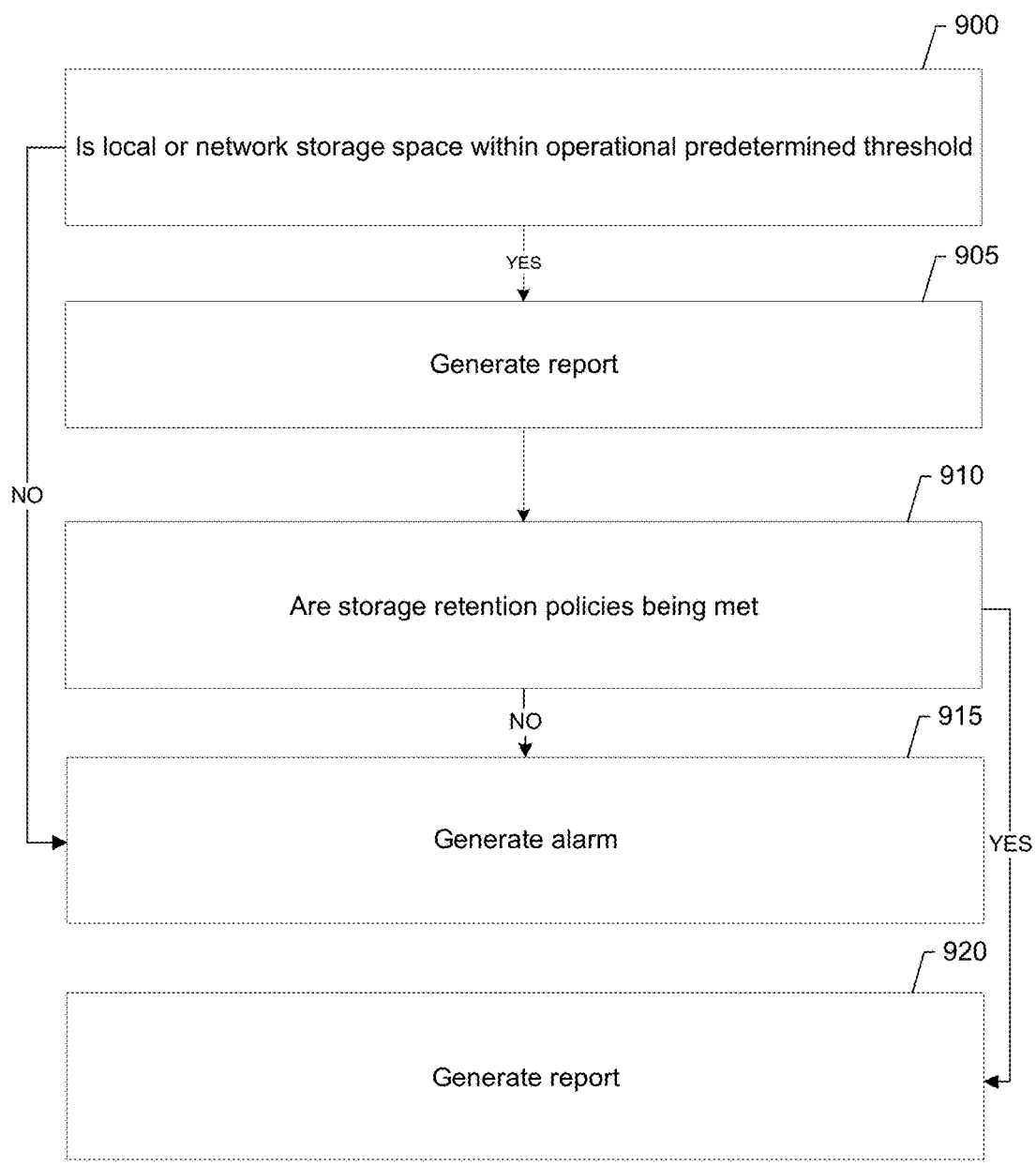
Figure 10:
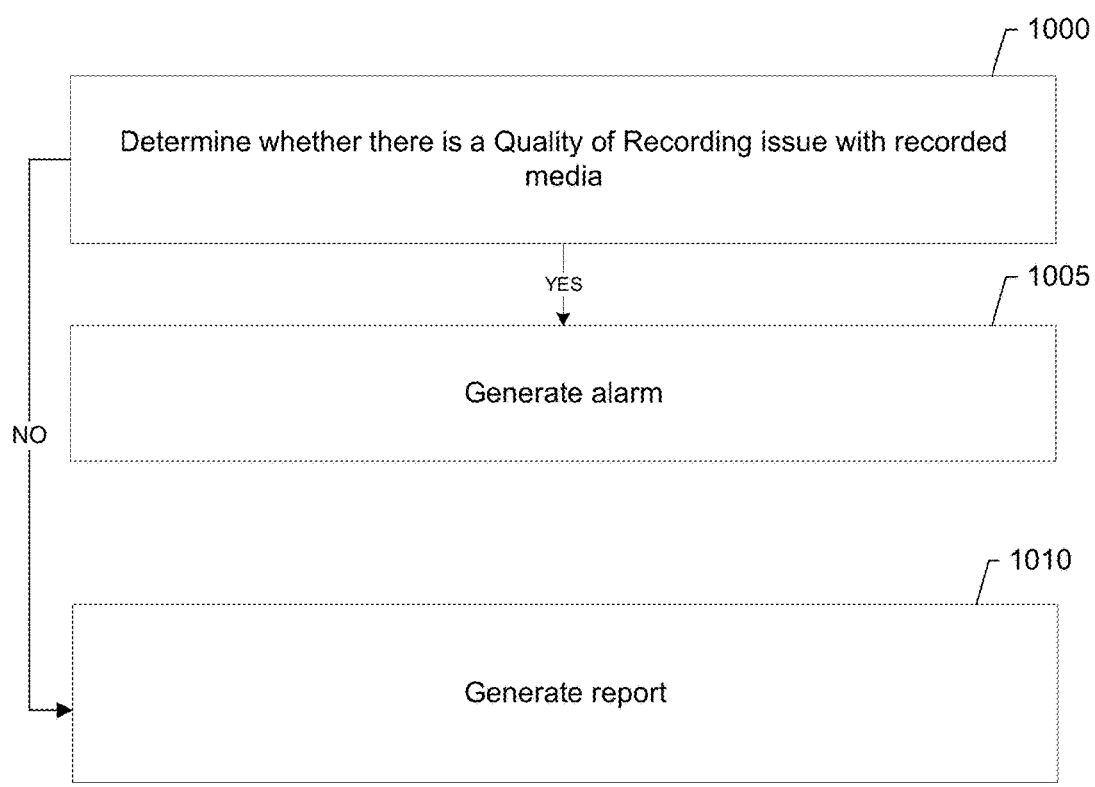
Figure 11:
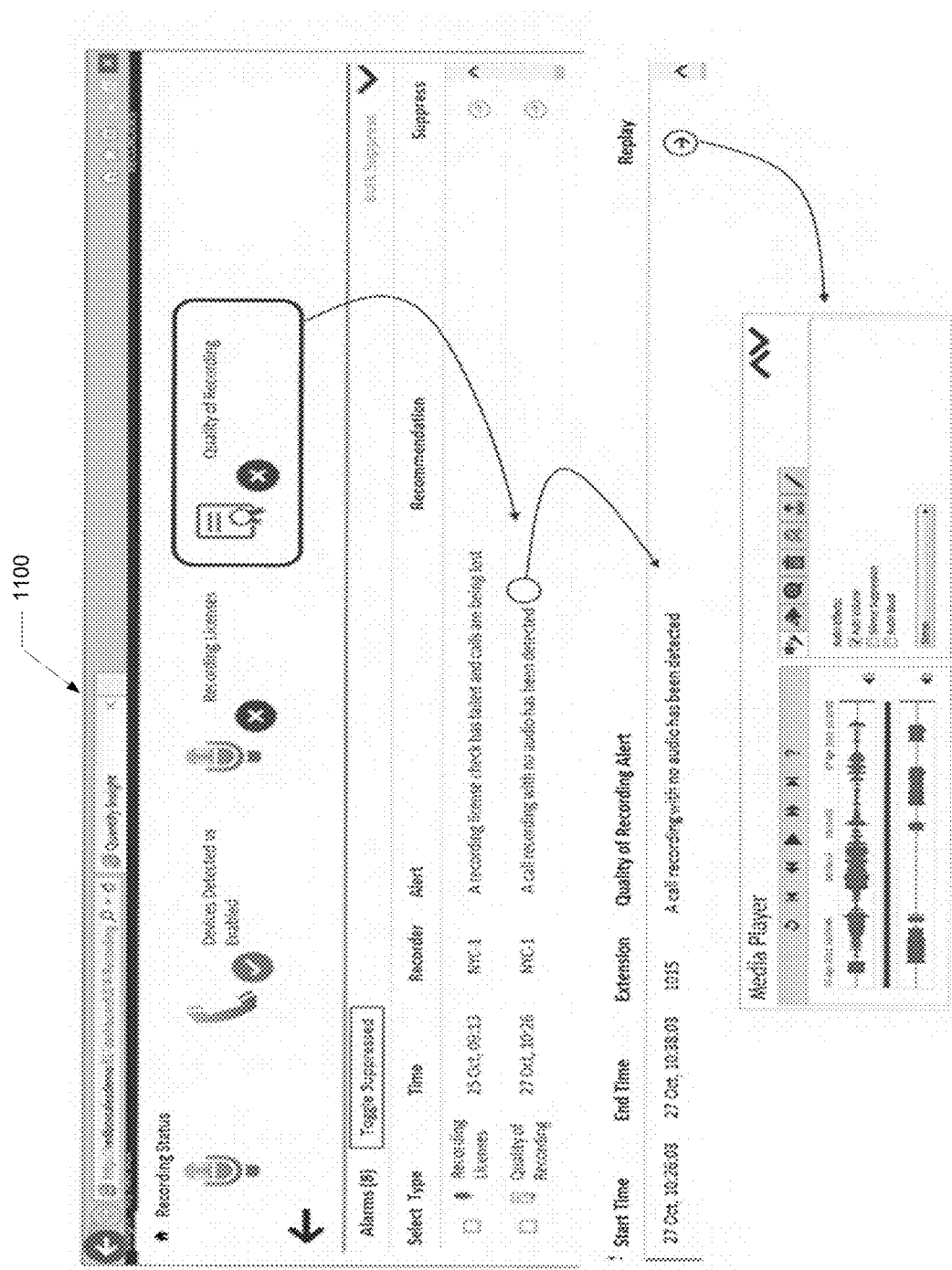
Figure 12:
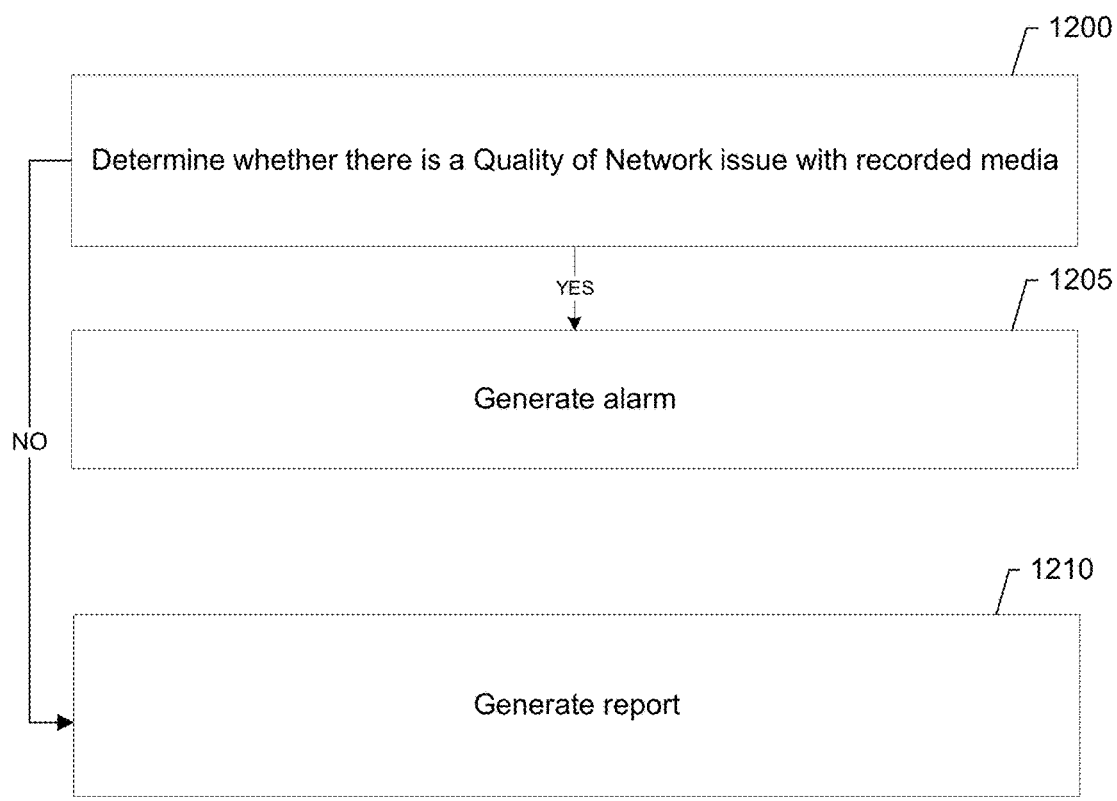
Figure 13:
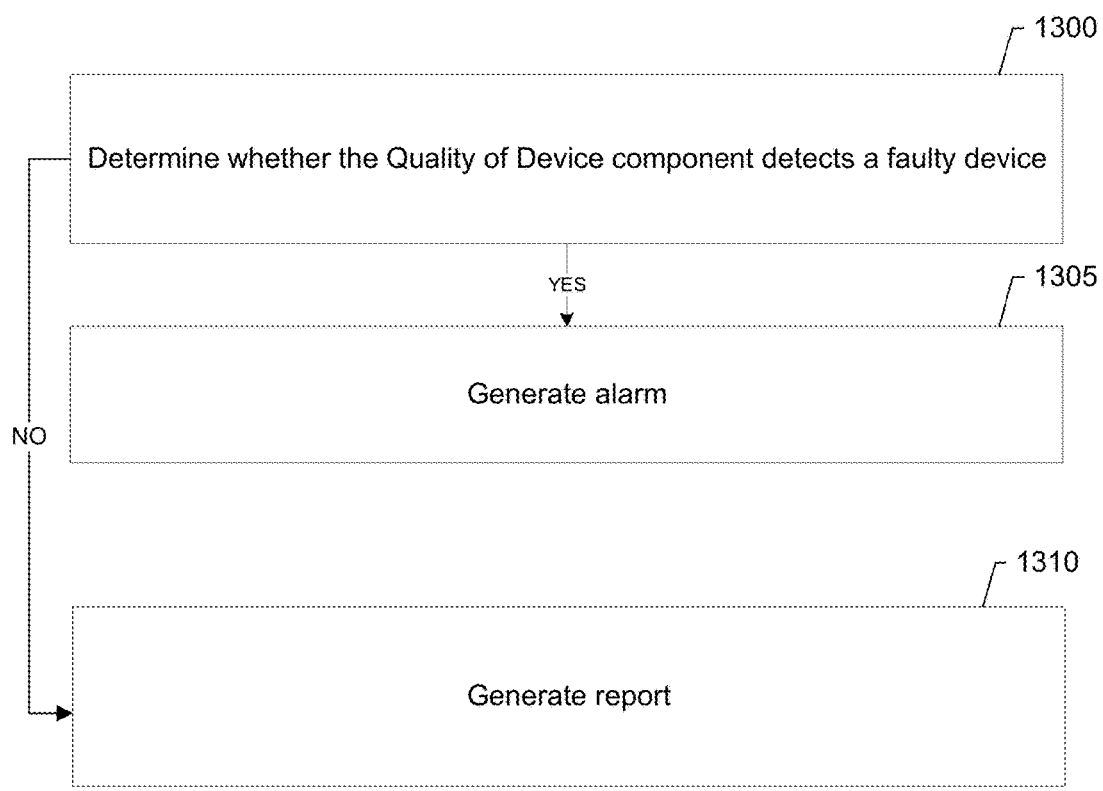
Figure 14:
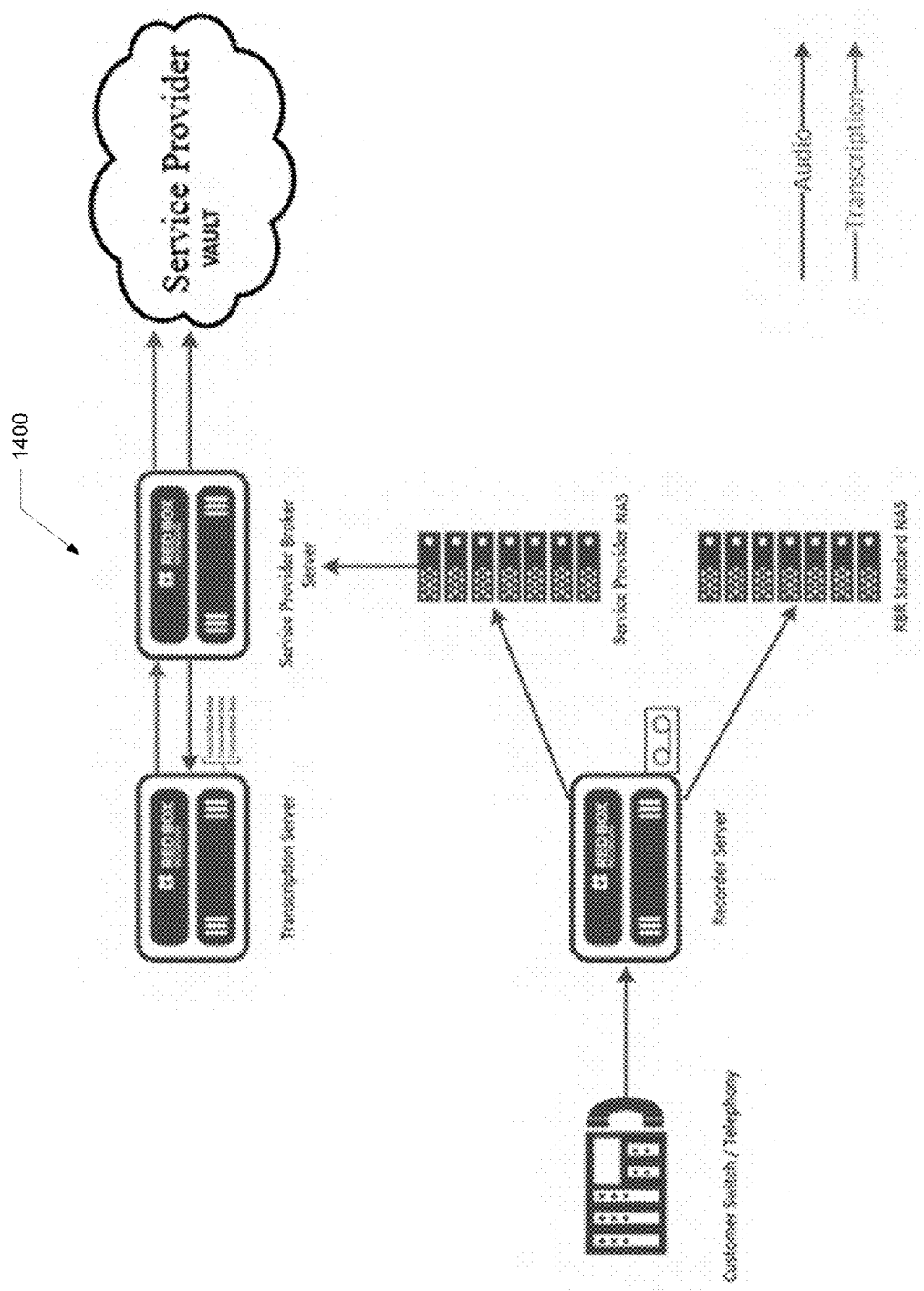
Figure 15:
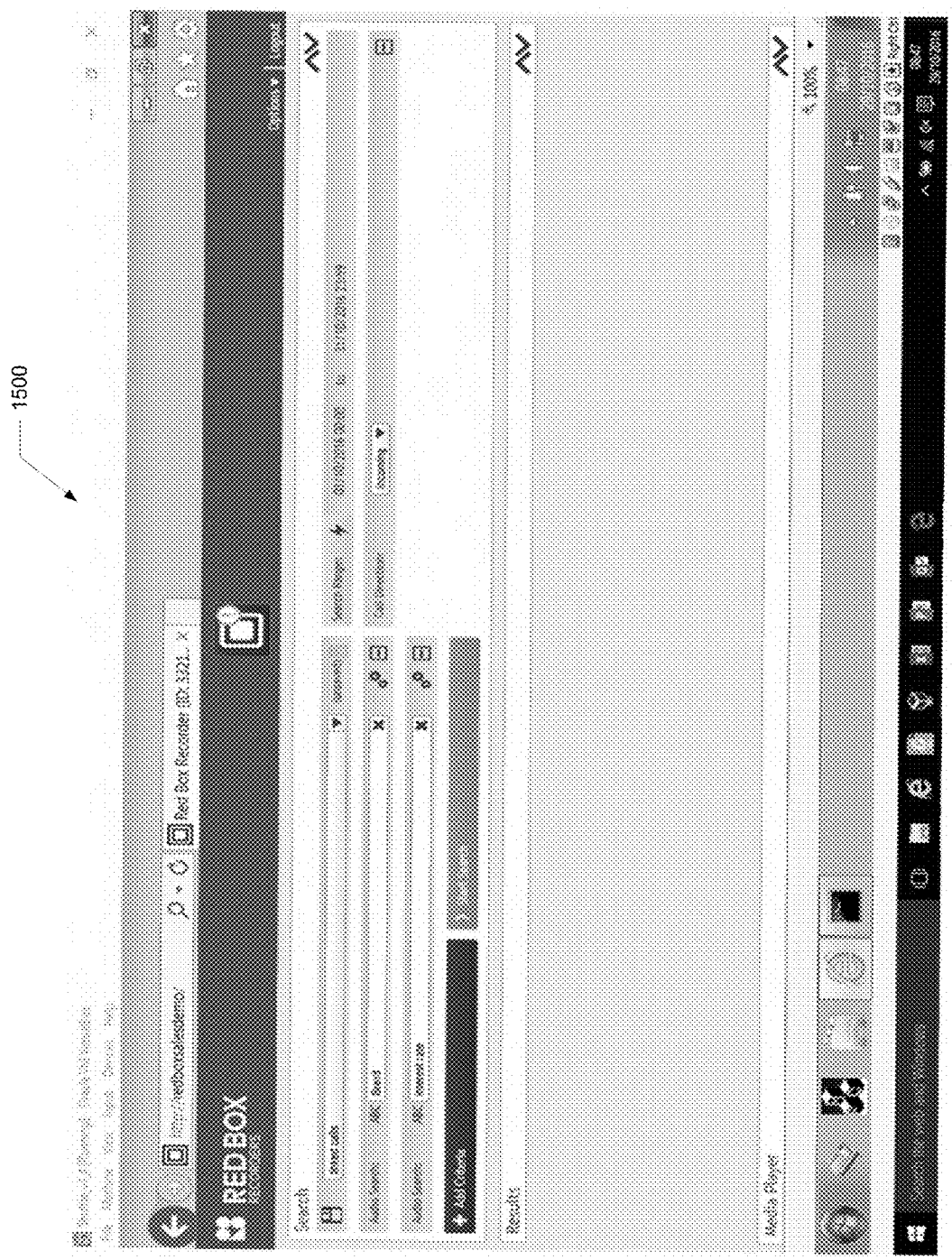
Figure 16:
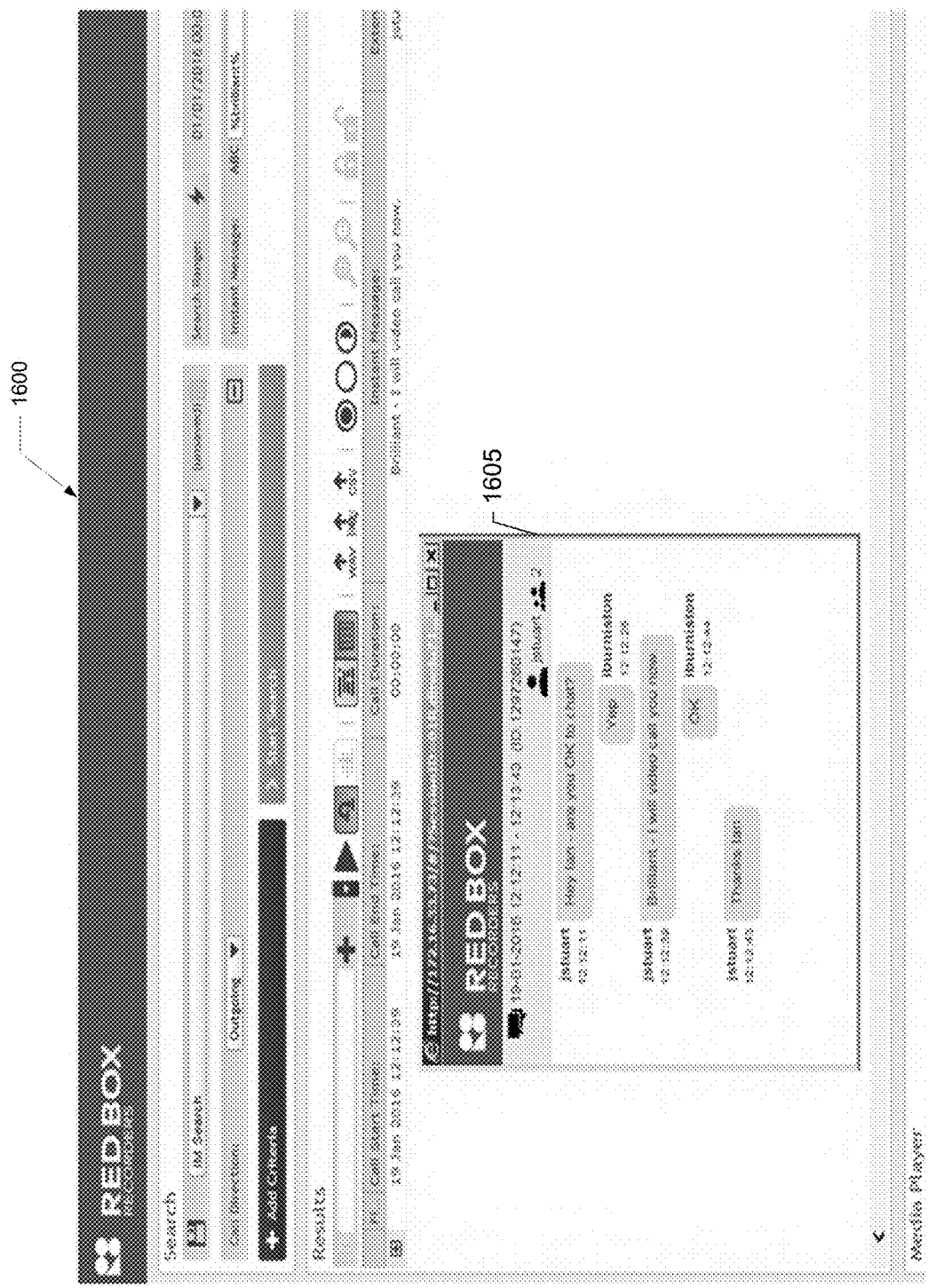
Figure 17:
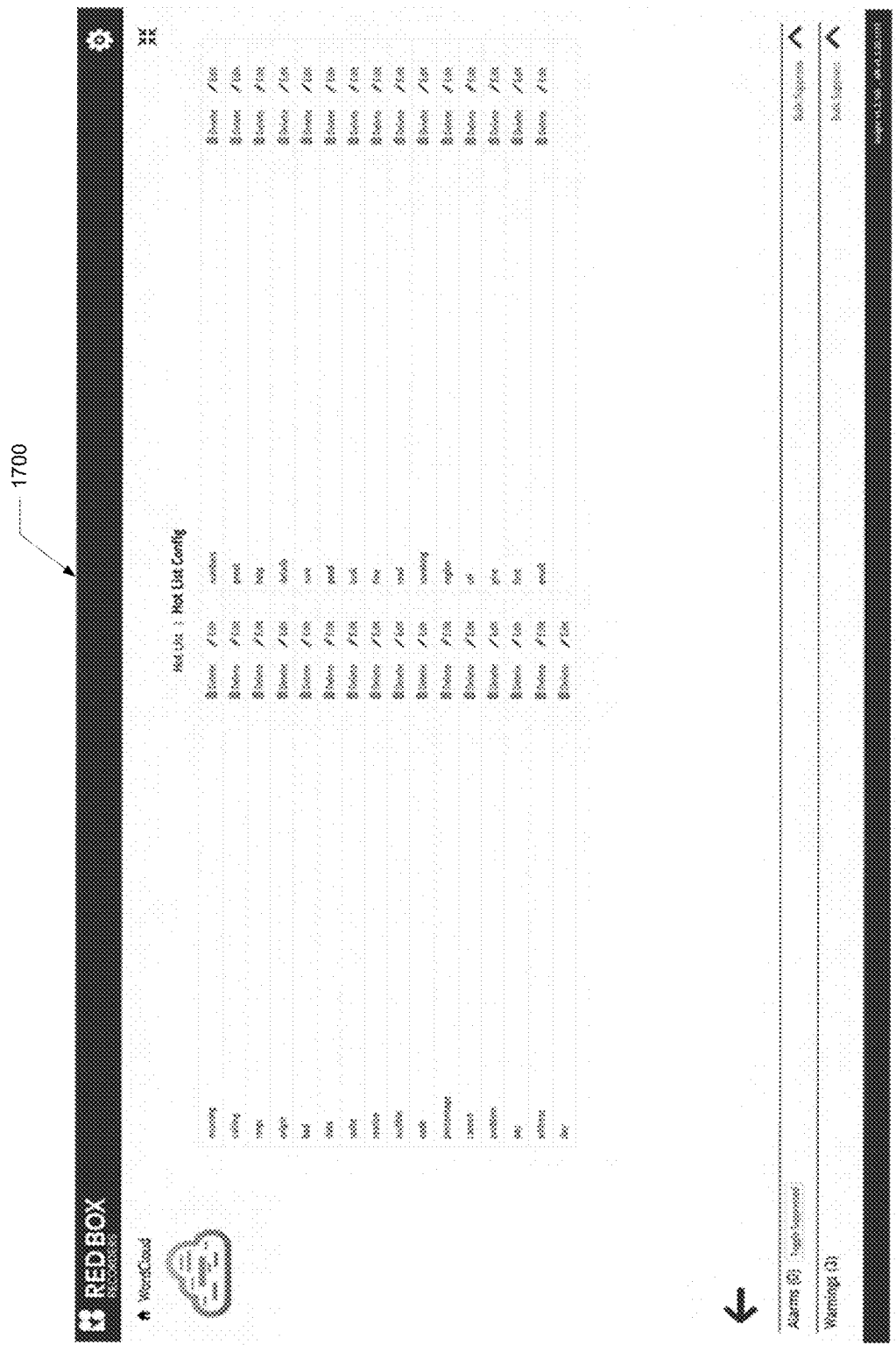
Figure 18:
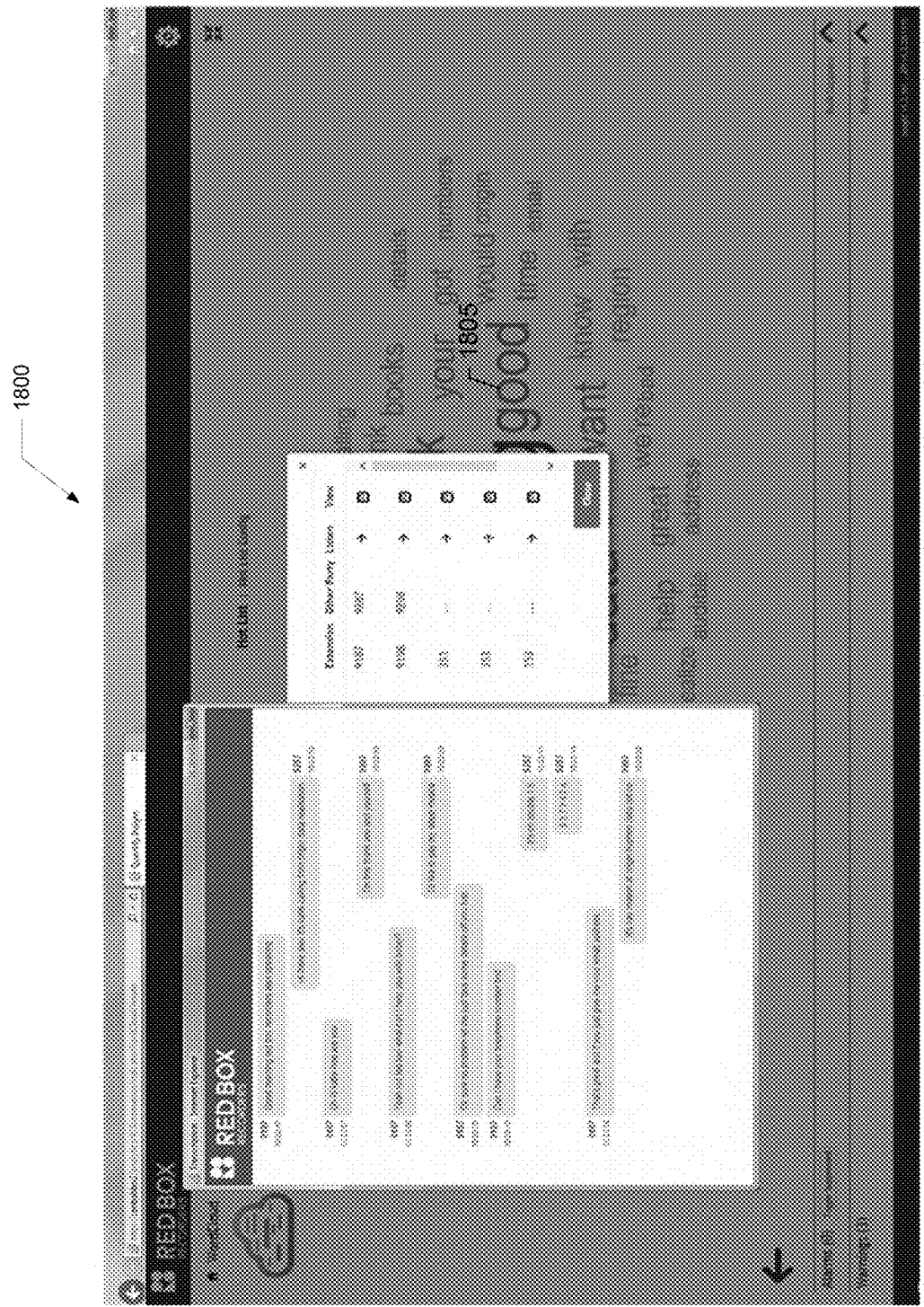
Figure 19:
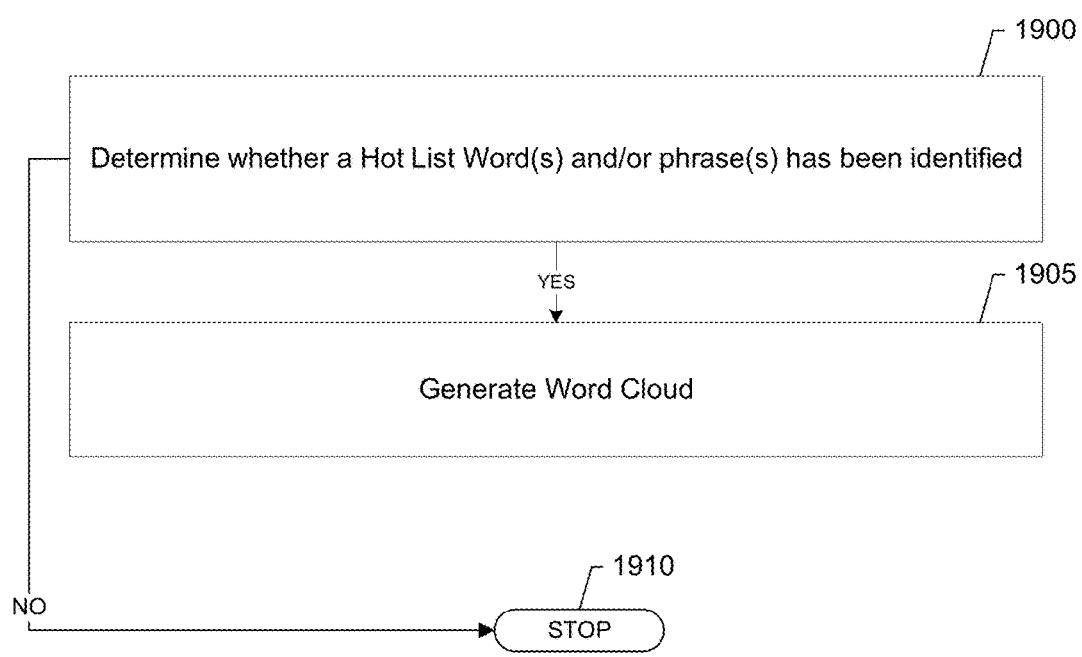
Figure 20:
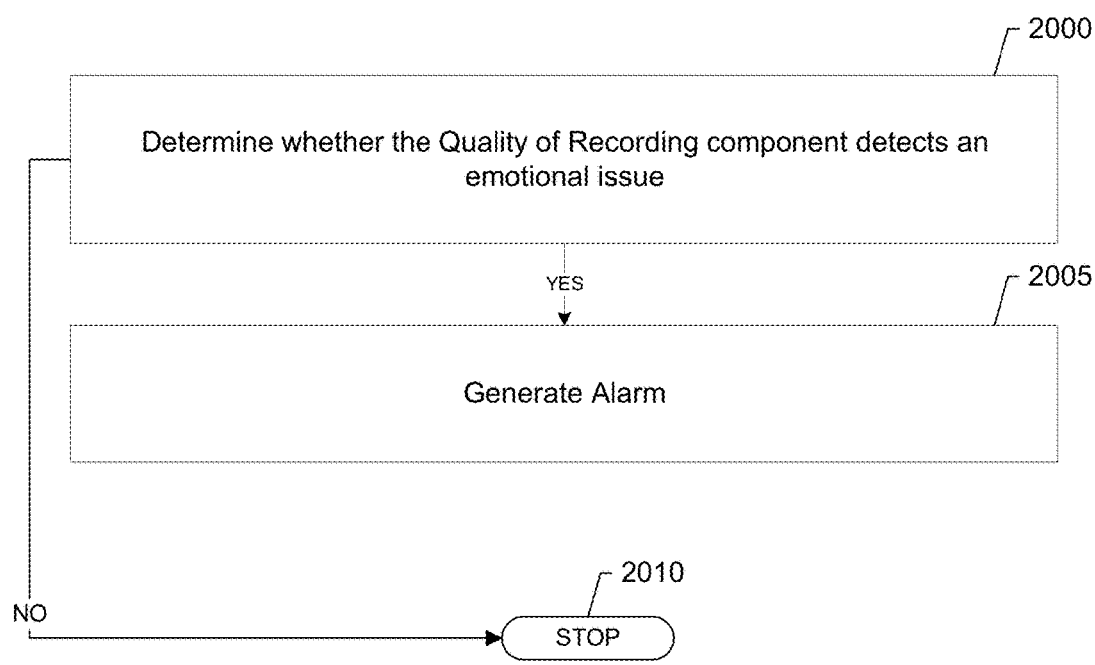
Figure 21:
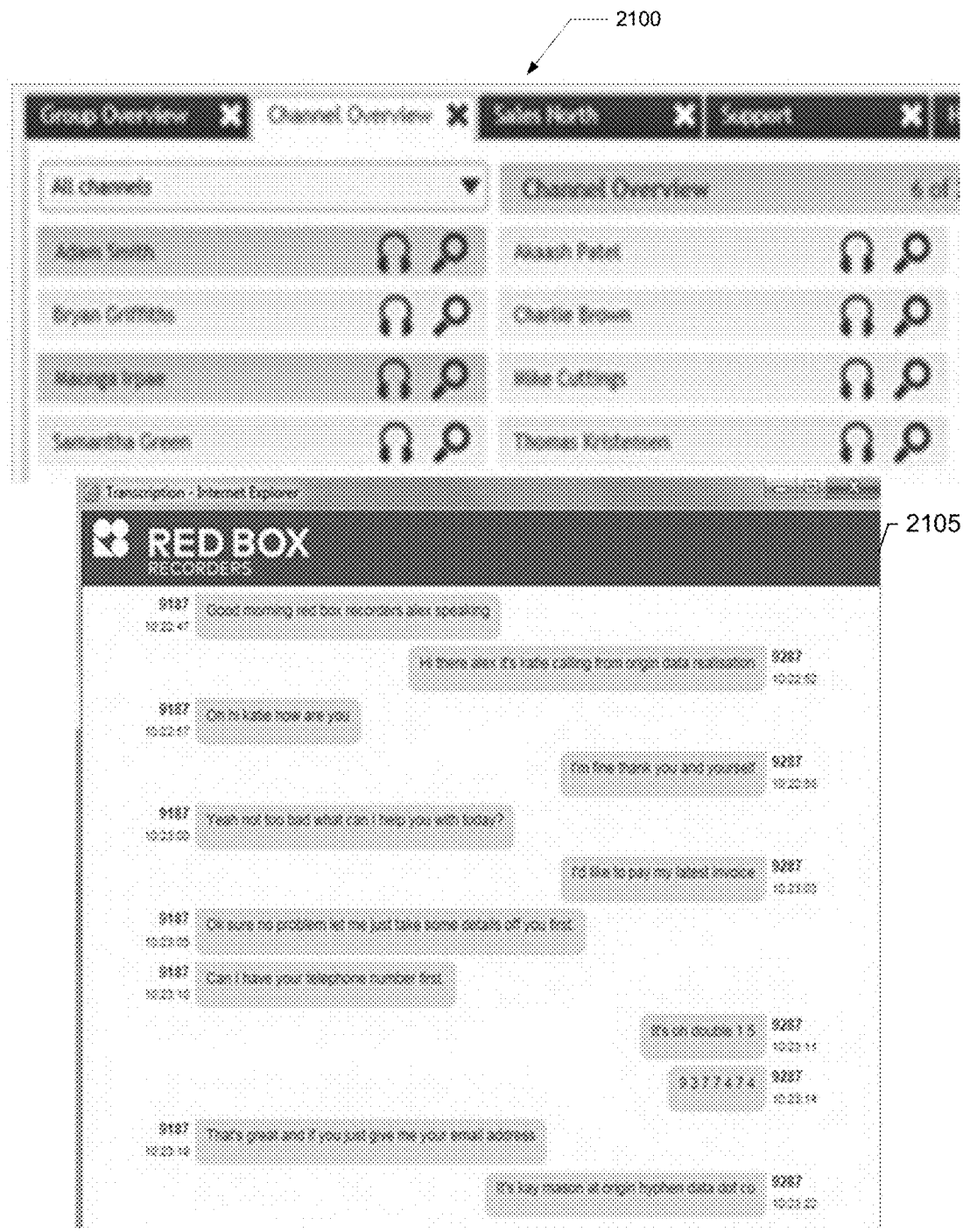
Figure 22:
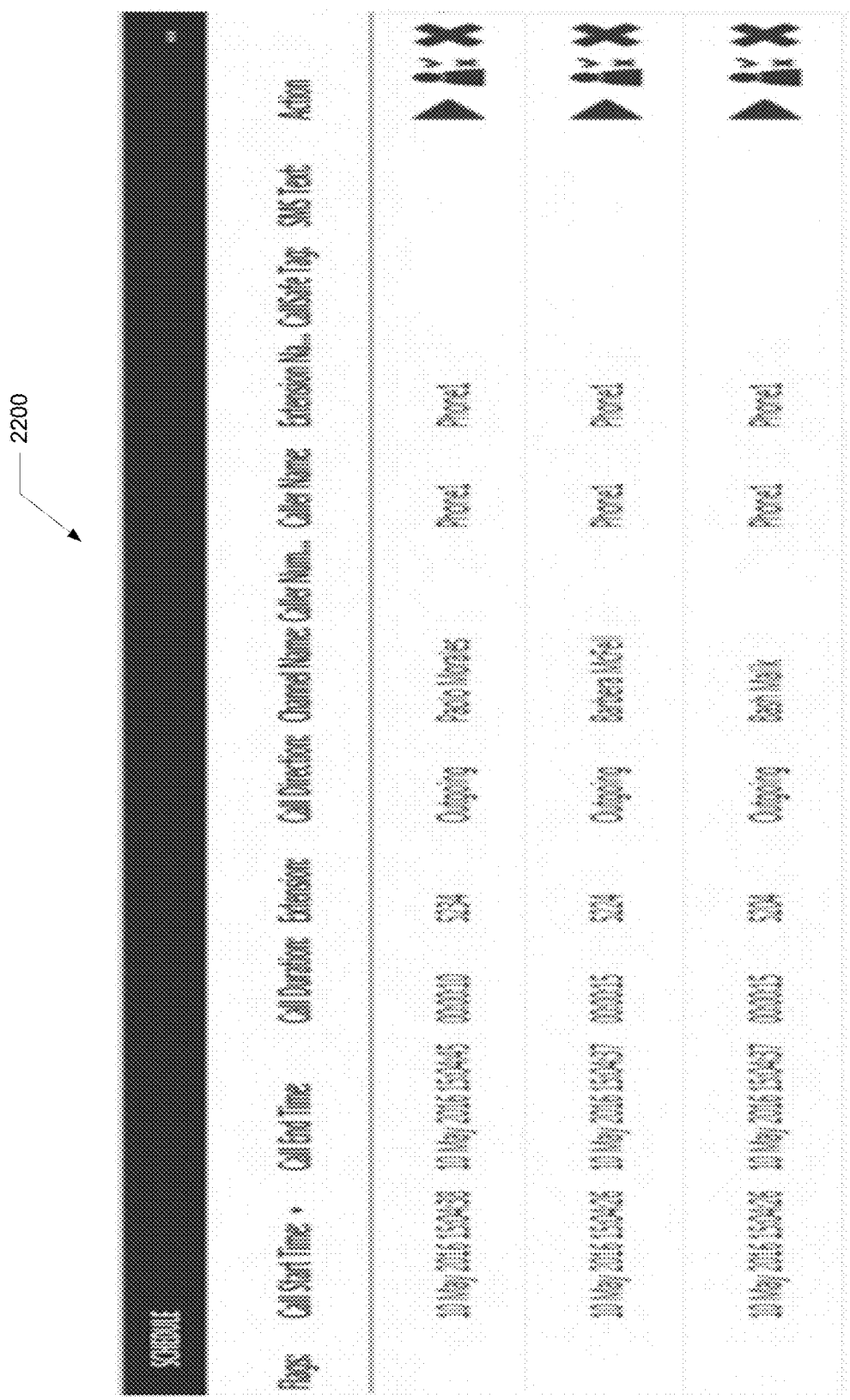
Figure 23:
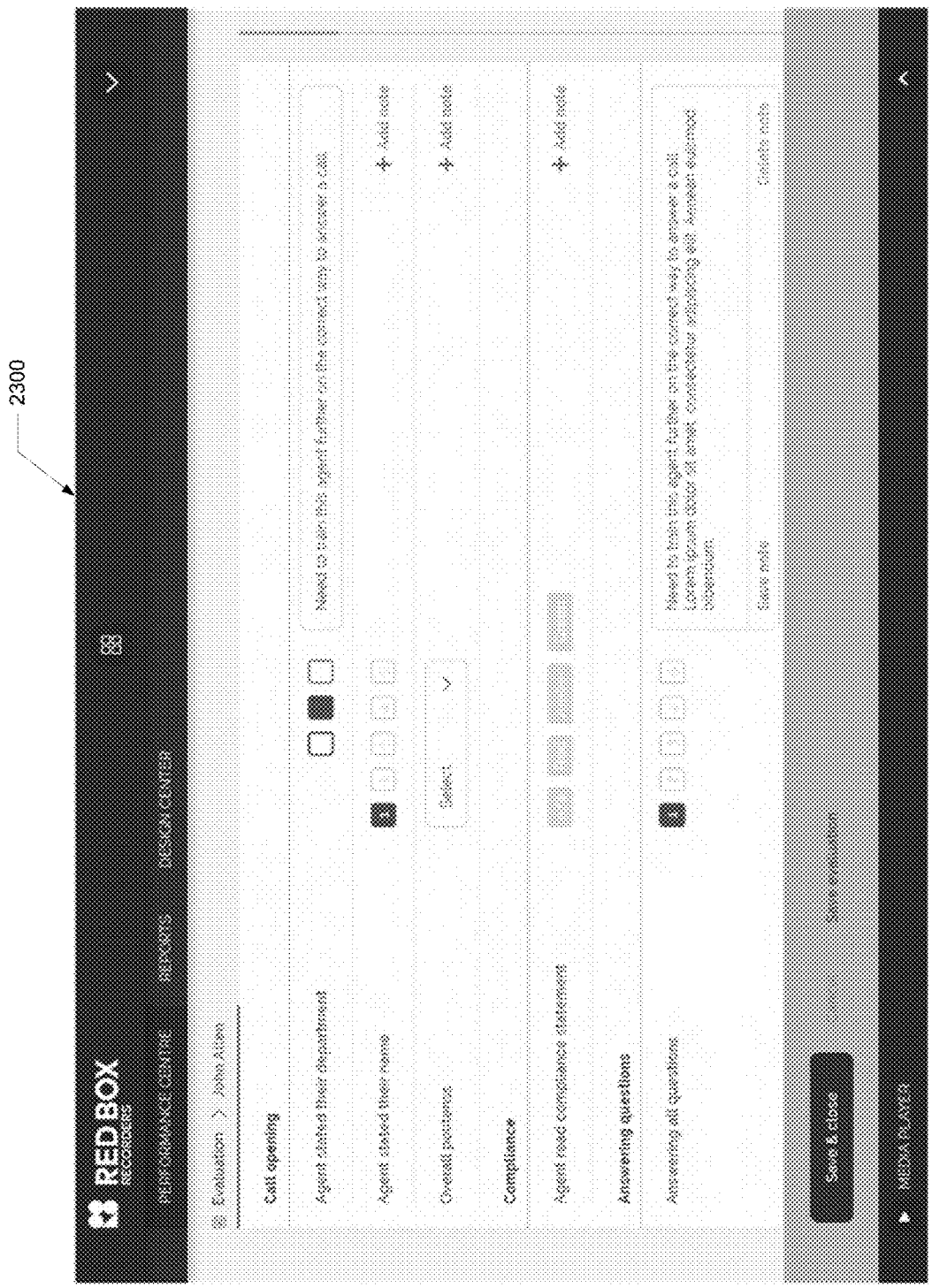
Figure 24:
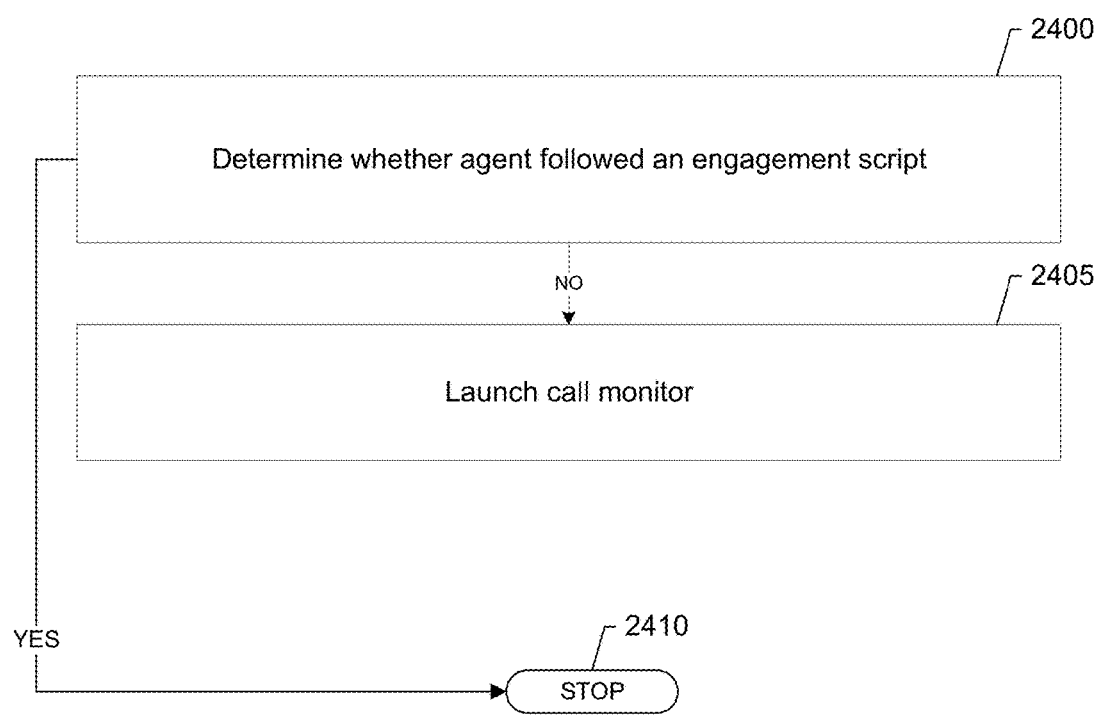
Figure 25:
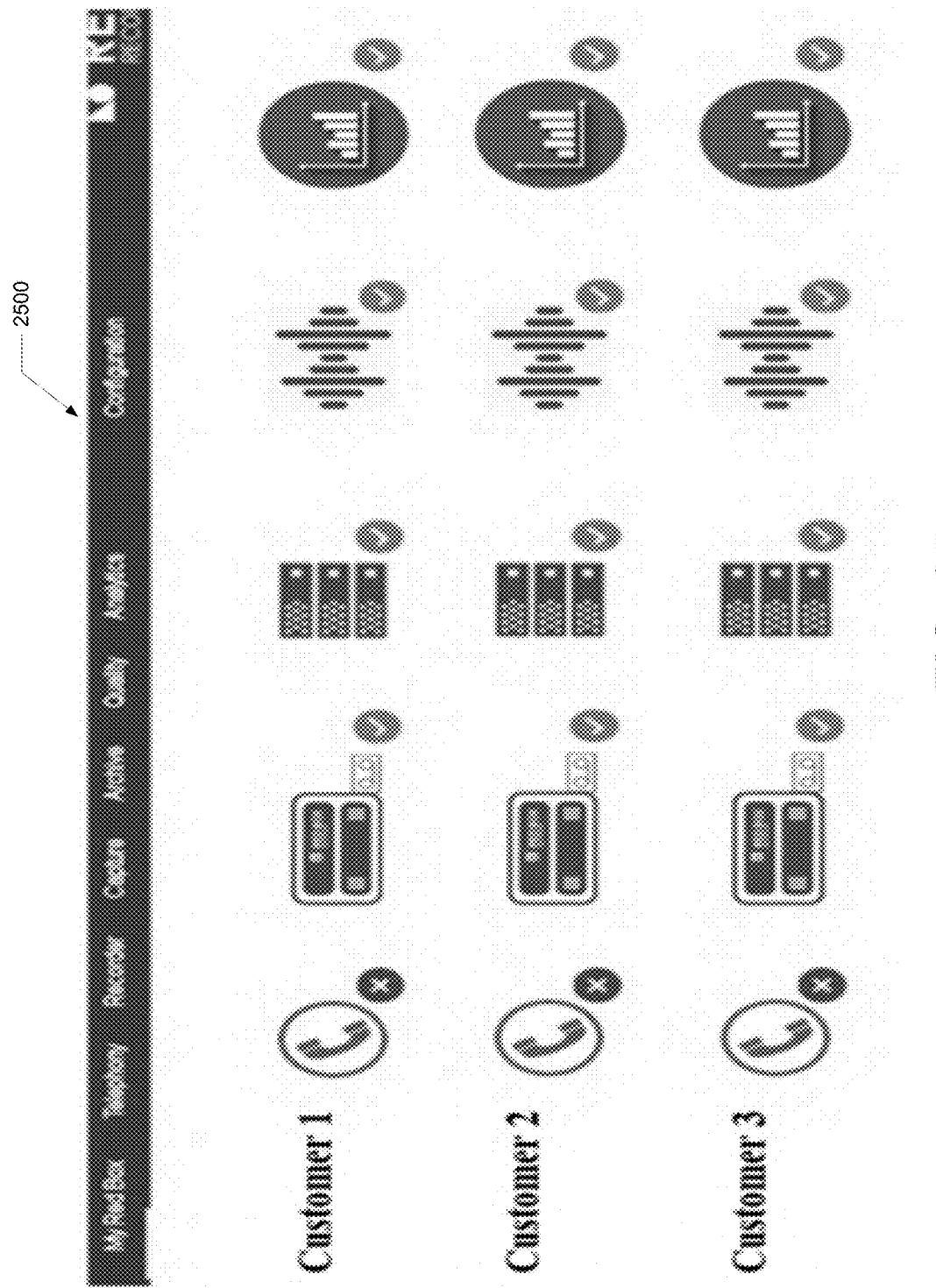
Figure 26:
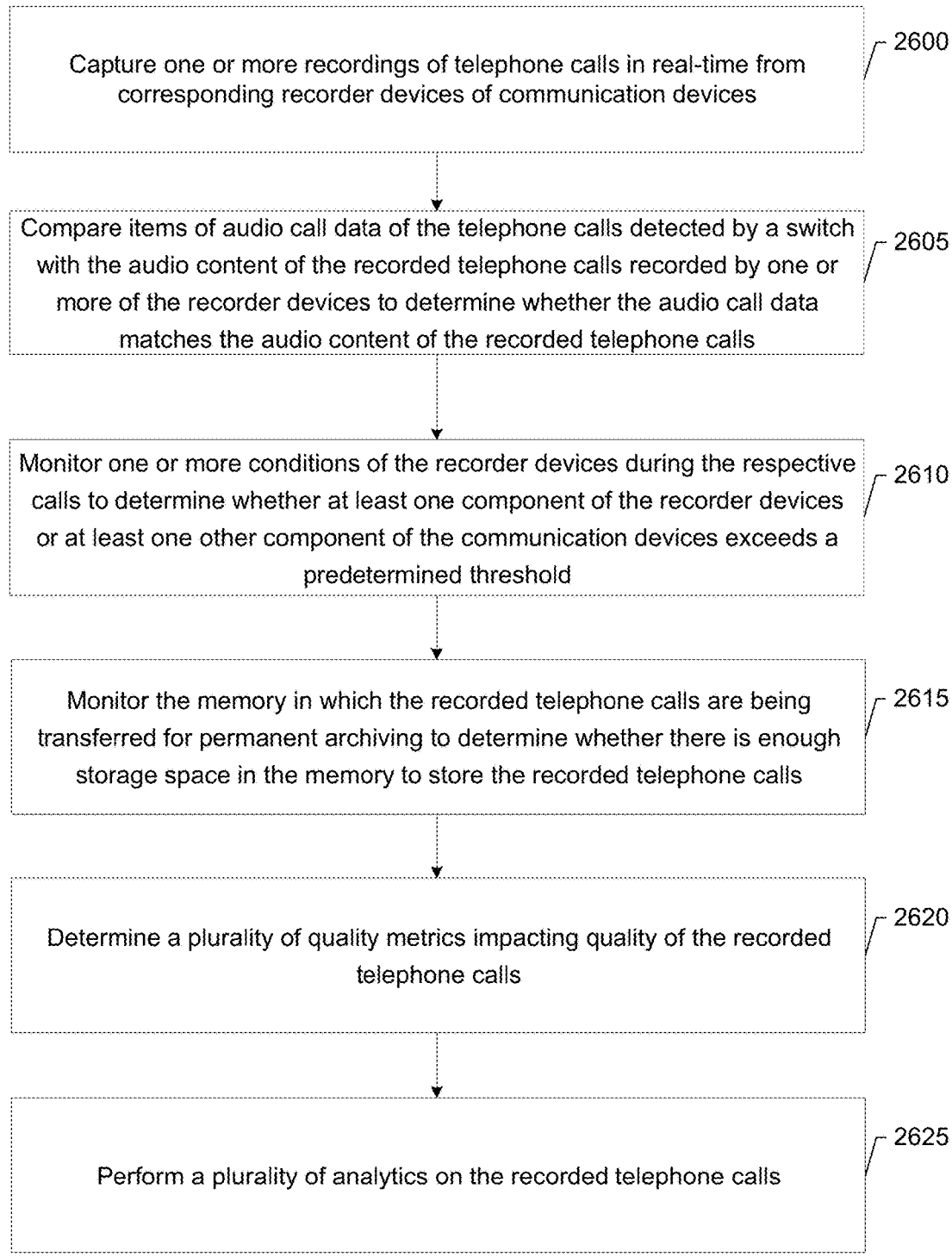

Having thus described some example embodiments of the invention in general terms, reference will now be made to the accompanying drawings, which are not necessarily drawn to scale, and wherein:

FIG. 1 is a schematic block diagram of a system according to an example embodiment;

FIG. 2 is a schematic block diagram of an apparatus according to an example embodiment;

FIG. 3 is a schematic block diagram of a network device according to an example embodiment;

FIGS. 4-5 are flow charts of exemplary processes according to exemplary embodiments;

FIG. 6 is a diagram illustrating a graph associated with a retention policy according to an example embodiment;

FIG. 7 is a diagram illustrating a graph indicating whether a memory is becoming full according to an example embodiment;

FIG. 8 is a diagram illustrating a graph indicating whether data being transferred from a recorder(s) to a Network Archive Storage (NAS) is being delayed according to an example embodiment;

FIGS. 9-10 are flow charts of exemplary processes according to example embodiments;

FIG. 11 is a diagram of an exemplary user interface pertaining to quality of recording according to an example embodiment;

FIGS. 12-13 are flow charts of exemplary processes according to example embodiments;

FIG. 14 is a block diagram of a system illustrating a service provider's vault according to an example embodiment;

FIG. 15 is a diagram of an exemplary user interface associated with an audio search according to an example embodiment;

FIG. 16 is a diagram of an exemplary user interface associated with transcriptions of audio according to an example embodiment;

FIG. 17 is a diagram of an exemplary user interface pertaining to a word(s) and/or phrase(s) of a Hot List according to an example embodiment;

FIG. 18 is a diagram of an exemplary user interface pertaining to audio associated with a Hot List according to an example embodiment;

FIGS. 19-20 are flow charts of exemplary processes according to example embodiments;

FIGS. 21-22 are diagrams of exemplary user interfaces according to example embodiments;

FIG. 23 is a diagram of an exemplary user interface associated with a targeted evaluation according to an exemplary embodiment;

FIG. 24 is a flow chart of an exemplary process according to an exemplary embodiment;

FIG. 25 is a diagram of an exemplary user interface according to an exemplary embodiment; and FIG. 26 illustrates a flow chart of an exemplary process according to an exemplary embodiment.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (for example, volatile or non-volatile memory device), may be differentiated from a "computer-readable transmission medium," which refers to an electromagnetic signal.

Additionally, as referred to herein an "Insight alarm" may include a series of notifications indicating that an application (e.g., an Insight application), network, or function is not operating to normal conditions or has exceeded a set threshold, as specified by a system administrator, with further detail describing the indicated condition. The term "Insight report" may refer to a summary of the "Insight alarm" that may be viewed within the application or output (e.g., to paper copy). The term "Insight display" may refer to an application graphical user interface (GUI) representation of an "Insight alarm" with color and status indicators to show the severity and urgency of the data, providing further detail when selected including remedial actions that could be applied to remove the "Insight alarm".

Overview

Various embodiments of the present invention relate generally to monitoring various stages of one or more calls, transcribing calls and generating analytics pertaining to the calls. An exemplary embodiment of the present invention is the implementation of the monitoring solutions described herein in the context of a call center; although the invention is not limited to simply this embodiment, but can be implemented in other environments as well, such as financial service companies or emergency services organizations.

The concept of guaranteed performance in call center monitoring covers the effectiveness of people, processes and technology. Solutions exist to monitor and track individual components of the call center monitoring process, but a one-size-fits all solution is needed to provide continuity throughout every step of the process, and to allow for monitoring of the entirety of a call center workflow, from the telephony all the way through to the transcription and analytics of the call itself. The discrete and modular approach to monitoring solutions fails to provide the capability of a total flow monitoring system, and as technology and network demands grow, these outdated solutions become incapable of providing the needed support that a total flow monitoring system can provide.

As pointed out above, some outdated solutions of call center monitoring, provide individual and discrete monitoring solutions. What is missing, however, is a comprehensive, unified system and method for monitoring each and every step all the way through the call center process, in a way that allows for the results or readings from one step in the process to factor into the next—allowing for unparalleled control and understanding of the call center process as a whole. End-to-end flow monitoring is critical to understanding every step in the call center recording process, and as the demands of the system become more challenging, ensuring healthy system functions and monitoring the flow becomes more imperative. Monitoring each portion of the flow separately becomes less economical and even prohibitive to proper system monitoring.

For instance, legacy programs that are directed solely to telephony monitoring do not offer the capability to simultaneously analyze transcriptions of the calls themselves, forcing the use of multiple, disjointed, expensive programs to provide solutions for these separate and distinct portions of the call. Such ad hoc solutions lead to inefficiencies, difficulty in monitoring the system as a whole, and redundancies—or worse yet—gaps in system monitoring coverage. Applicant has identified that as technological advances have become more common in call centers; requiring, for instance, the monitoring and synchronization of high-definition (HD) audio, or bandwidth heavy high-definition video, the latencies and losses of these discrete monitoring solutions may go from poor quality of system monitoring to simply no longer being viable at all. In this regard, the exemplary embodiments may provide technical solutions to these technical problems by analyzing call metrics, including critical measures of network performance such as jitter, latency, and packet loss. For example, should any of these metrics fall out of specification, the exemplary embodiments may quickly detect and report any component of the call monitoring system that is not operating as required, and facilitate quick repair and/or shifting the flow of telephony to avoid components of the network that may not be operating properly. In this regard, the exemplary embodiments improve jitter, latency, and packet loss at the network.

As such, systems structured in accordance with various embodiments of the invention provide specific, technical solutions to technical problems faced by some systems.

Example System Architecture

FIG. 1 illustrates a generic system diagram in which a device such as a mobile device 5 is shown in an example communication environment. As shown in FIG. 1, an embodiment of a system in accordance with an example embodiment of the invention may include a first electronic communication device (for example, mobile device 5), a second electronic communication device 10 and a third electronic communication device 15 capable of communication with each other via a network 20. Some example embodiments may further include one or more additional communication devices, one of which is depicted in FIG. 1 as a fourth electronic communication device 30. In one embodiment, not all systems that employ an embodiment of the invention may comprise all the devices illustrated and/or described herein. While an embodiment of the mobile device 5 and/or second, third and fourth electronic communication devices 10, 15 and 30 may be illustrated and hereinafter described for purposes of example, other types of terminals, such as portable digital assistants (PDAs), pagers, mobile televisions, mobile telephones, tablet computing devices, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the invention.

The network 20 may include a collection of various different nodes (of which the second, third and fourth electronic communication devices 10, 15 and 30 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 20. Although not necessary, in one embodiment, the network 20 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), LTE advanced (LTE-A) and/or the like. In one embodiment, the network 20 may be a point-to-point (P2P) network.

In exemplary embodiments, one or more communication terminals such as the mobile device 5 and the second, third and fourth electronic communication devices 10, 15 and 30 may communicate with each other via the network 20 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (for example, personal computers, server computers or the like) may be coupled to the mobile device 5 and the second, third and fourth electronic communication devices 10, 15 and 30 via the network 20. By directly or indirectly connecting the mobile device 5 and the second, third and fourth electronic communication devices 10, 15 and 30 (and/or other devices) to the network 20, the mobile device 5 and the second, third and fourth electronic communication devices 10, 15 and 30 may be enabled to communicate with the other devices or each other, for example, according to numerous communication protocols including Hypertext Transfer Protocol (HTTP) and/or the like, to thereby carry out various communication or other functions of the mobile device 5 and the second, third and fourth electronic communication devices 10, 15 and 30, respectively.

Moreover, the mobile device 5 and the second, third and fourth electronic communication devices 10, 15 and 30 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile device 5 and the second, third and fourth electronic communication devices 10, 15 and 30 may be enabled to communicate with the network 20 and each other by any of numerous different access mechanisms. For instance, mobile access mechanisms such as LTE, Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first electronic communication device (for example, the mobile device 5) may be a mobile communication device such as, for example, a wireless telephone or other devices such as a personal digital assistant (PDA), mobile computing device, tablet computing device, camera, video recorder, audio/video player, positioning device, game device, television device, radio device, or various other like devices or combinations thereof. The second electronic communication device 10, the third electronic communication device 15 and the fourth electronic communication device 30 may be mobile or fixed communication devices. However, in one example, the second electronic communication device 10, the third electronic communication device 15 and the fourth electronic communication device 30 may be servers, remote computers or terminals such as, for example, personal computers (PCs) or laptop computers.

In an example embodiment, the network 20 may be an ad hoc or distributed network arranged to be a smart space. Thus, devices may enter and/or leave the network 20 and the devices of the network 20 may be capable of adjusting operations based on the entrance and/or exit of other devices to account for the addition or subtraction of respective devices or nodes and their corresponding capabilities.

In some example embodiments, the mobile device 5 as well as the second, third and fourth electronic communication devices 10, 15 and 30 may employ an apparatus (for example, apparatus of FIG. 2) capable of employing an embodiment of the invention.

Example Apparatuses Utilized With Various Embodiments

FIG. 2 illustrates a schematic block diagram of an apparatus for facilitating one or more calls and capturing call content according to an example embodiment of the invention. An example embodiment of the invention will now be described with reference to FIG. 2, in which certain elements of an apparatus 50 are displayed. The apparatus 50 of FIG. 2 may be employed, for example, on the mobile device 5 (and/or the second electronic communication device 10, the third electronic communication device 15 or the fourth electronic communication device 30). Alternatively, the apparatus 50 may be embodied on a network device of the network 20. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (for example, the mobile device 5), by a plurality of devices in a distributed fashion (for example, on one or a plurality of devices in a P2P network) or by devices in a client/server relationship. Moreover, it should be noted that the devices or elements described below may not be mandatory and thus some may be omitted in a certain embodiment.

The apparatus 50 may include or otherwise be in communication with a processor 70, a user interface 67, a communication interface 74, a memory device 76, a display 85, a recorder device 36, a telephony component 78, a network 20 and a private/public branch exchange (PBX) switch 38. The memory device 76 may include, for example, volatile and/or non-volatile memory. For example, the memory device 76 may be an electronic storage device (for example, a computer readable storage medium) comprising gates configured to store data (for example, bits) that may be retrievable by a machine (for example, a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (for example, audio data (e.g., call recordings), call transcriptions, call analytics, etc.).

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (for example, physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (for example, a mobile device or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In some example embodiments, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 20). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (for example, software and/or firmware) stored on a memory accessible to the processor 70 (for example, memory device 76, and/or the like).

The apparatus 50 includes a media capturing element, such as recorder device 36 (also referred to herein as recorder 36). The recorder 36 may include an audio module, in communication with the processor 70. The recorder 36 may be any means for capturing audio for storage, display or transmission. In this regard, the recorder 36 may record one or more calls (e.g., telephone calls) between devices (e.g., apparatuses 50). The recorder 36 may also provide/send (e.g., in real-time) one or more recorded calls to a network device (e.g., network device 100).

The PBX switch 38 may be a telephone exchange or switching system that facilitates communications (e.g., telephone calls) between devices (e.g., apparatuses 50, network device 100) of a network. In this regard, the PBX switch 38 allows devices (e.g., apparatuses 50, network device 100) to directly connect such as, for example, via one or more telephone calls.

In an example embodiment, the processor 70 may be embodied as, include or otherwise control the telephony component 78. The telephony component 78 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the telephony component 78 as described below. Thus, in an example in which software is employed, a device or circuitry (for example, the processor 70 in one example) executing the software forms the structure associated with such means.

In an example embodiment, the telephony component 78 may capture and/or transmit speech or other audio associated with telephone calls between devices (e.g., apparatuses 50, network device 100) and may detect one or more call metrics as well as perform other features, as described more fully below.

Referring now to FIG. 3, a block diagram of an example embodiment of a network device is provided. As shown in FIG. 3, the network device 100 (e.g., also referred to herein as call monitoring system 100 (e.g., a server)) generally includes a display 110, a processor 104, a user input interface 105, a communication interface(s) 107, an associated memory 106, a recorder monitoring system device 112 (e.g., also referred to herein as recorder monitoring system 112), an archiving component 114, a Quality of Recording component 115, a Quality of Network component 116, a Quality of Device component 118, an analytics device 120 which includes a speech analytics engine 121, and a Quality Manager Device 122 (also referred to herein as Quality Manager 122). The memory 106 may comprise volatile and/or non-volatile memory, and may store content, data and/or the like. The memory 106 may store client applications, instructions, and/or the like for the processor 104 to perform the various operations of the network device 100.

The processor 104 may also be connected to at least one communication interface 107 or other means for displaying, transmitting and/or receiving data, content, and/or the like. The user input interface 105 may comprise any of a number of devices allowing the network device 100 to receive data from a user, such as a keypad, a touch display, a joystick or other input device. In this regard, the processor 104 may comprise user interface circuitry configured to control at least some functions of one or more elements of the user input interface. The processor 104 and/or user interface circuitry of the processor 104 may be configured to control one or more functions of one or more elements of the user interface through computer program instructions (e.g., software and/or firmware) stored on a memory accessible to the processor 104 (e.g., volatile memory, non-volatile memory, and/or the like).

In one example embodiment, the processor 104 may receive and/or transmit communications and data between devices (e.g., apparatuses 50). The processor 104 may also generate call analytics, as well as perform other features, as described more fully below.

In an example embodiment, the processor 104 may be embodied as, include or otherwise control the recorder monitoring system device 112. The recorder monitoring system device 112 may be any means such as a device or circuitry operating in accordance with software or otherwise embodied in hardware or a combination of hardware and software (for example, processor 104 operating under software control, the processor 104 embodied as an ASIC or FPGA specifically configured to perform the operations described herein, or a combination thereof) thereby configuring the device or circuitry to perform the corresponding functions of the recorder monitoring system device 112, as described below. Thus, in an example in which software is employed, a device or circuitry (for example, the processor 104 in one example) executing the software forms the structure associated with such means.

In an example embodiment, the recorder monitoring system device 112 may monitor recording data from one or more recorders (e.g., recorders 36) of devices (e.g., apparatuses 50), as described more fully below.

In some other exemplary embodiments, the processor 104 may be embodied as, include or otherwise control the archiving component 114. The archiving component 114 may be any means such as a device or circuitry operating in accordance with software or otherwise embodied in hardware or a combination of hardware and software (for example, processor 104 operating under software control, the processor 104 embodied as an ASIC or FPGA specifically configured to perform the operations described herein, or a combination thereof) thereby configuring the device or circuitry to perform the corresponding functions of the archiving component 114, as described below. Thus, in an example in which software is employed, a device or circuitry (for example, the processor 104 in one example) executing the software forms the structure associated with such means.

In an example embodiment, the archiving component 114 may analyze whether a recorder(s) (e.g., a recorder(s) 36) has successfully captured recordings, either locally, or archived to a network storage (e.g., a Network Archive Storage (NAS)), as described more fully below.

In yet some other exemplary embodiments, the processor 104 may be embodied as, include or otherwise control the Quality of Recording component 115. The Quality of Recording component 115 may be any means such as a device or circuitry operating in accordance with software or otherwise embodied in hardware or a combination of hardware and software (for example, processor 104 operating under software control, the processor 104 embodied as an ASIC or FPGA specifically configured to perform the operations described herein, or a combination thereof) thereby configuring the device or circuitry to perform the corresponding functions of the Quality of Recording component 115, as described below. In an example in which software is employed, a device or circuitry (for example, the processor 104 in one example) executing the software forms the structure associated with such means.

In an example embodiment, the Quality of Recording component 115 may analyze and perform intelligent data sampling of recorded media (e.g., audio/video data of a call, etc.) to ensure the quality of the recorded media, as described more fully below.

In yet some other exemplary embodiments, the processor 104 may be embodied as, include or otherwise control the Quality of Network component 116. The Quality of Network component 116 may be any means such as a device or circuitry operating in accordance with software or otherwise embodied in hardware or a combination of hardware and software (for example, processor 104 operating under software control, the processor 104 embodied as an ASIC or FPGA specifically configured to perform the operations described herein, or a combination thereof) thereby configuring the device or circuitry to perform the corresponding functions of the Quality of Network component 116, as described below. In an example in which software is employed, a device or circuitry (for example, the processor 104 in one example) executing the software forms the structure associated with such means.

In an example embodiment, the Quality of Network component 116 may analyze and monitor different aspects of network performance, as described more fully below.

In some other exemplary embodiments, the processor 104 may be embodied as, include or otherwise control the Quality of Device component 118. The Quality of Device component 118 may be any means such as a device or circuitry operating in accordance with software or otherwise embodied in hardware or a combination of hardware and software (for example, processor 104 operating under software control, the processor 104 embodied as an ASIC or FPGA specifically configured to perform the operations described herein, or a combination thereof) thereby configuring the device or circuitry to perform the corresponding functions of the Quality of Device component 118, as described below. In an example in which software is employed, a device or circuitry (for example, the processor 104 in one example) executing the software forms the structure associated with such means.

In an example embodiment, the Quality of Device component 118 may analyze and perform checks to ensure that devices that need to be recording are recording one or more telephone calls, as described more fully below.

In some other exemplary embodiments, the processor 104 may be embodied as, include or otherwise control the analytics device 120. The analytics device 120 may be any means such as a device or circuitry operating in accordance with software or otherwise embodied in hardware or a combination of hardware and software (for example, processor 104 operating under software control, the processor 104 embodied as an ASIC or FPGA specifically configured to perform the operations described herein, or a combination thereof) thereby configuring the device or circuitry to perform the corresponding functions of the analytics device 120, as described below. In an example in which software is employed, a device or circuitry (for example, the processor 104 in one example) executing the software forms the structure associated with such means.

In an example embodiment, the analytics device 120 may perform analytics on one or more calls (e.g., telephone calls), as described more fully below. The analytics device 120 may include a speech analysis engine 121 which may analyze voice data and may transcribe the voice data to text, as described more fully below.

In yet some other exemplary embodiments, the processor 104 may be embodied as, include or otherwise control the Quality Manager 122. The Quality Manager 122 may be any means such as a device or circuitry operating in accordance with software or otherwise embodied in hardware or a combination of hardware and software (for example, processor 104 operating under software control, the processor 104 embodied as an ASIC or FPGA specifically configured to perform the operations described herein, or a combination thereof) thereby configuring the device or circuitry to perform the corresponding functions of the Quality Manager 122, as described below. In an example in which software is employed, a device or circuitry (for example, the processor 104 in one example) executing the software forms the structure associated with such means.

In an example embodiment, the Quality Manager 122 may perform one or more quality checks associated with calls, as described more fully below.

Example Data Flows

As mentioned, various exemplary embodiments monitor various stages of one or more calls, transcribe the calls and generate analytics pertaining to the calls.

In this regard, the exemplary embodiments provide end to end, comprehensive, call center monitoring solutions that monitor all steps of a call, represented by seven steps or components: Telephony, Recording, Archiving, Audio Quality, Network Quality, Device Quality, and Analytics. Instead of developing or implementing programs dedicated to each individual component, the exemplary embodiments offer a full end-to-end monitoring process that is continuous and consistent throughout all the steps, allowing for a new level of control and quality assurance.

As such, the exemplary embodiments provide an end-to-end system flow that includes each of the seven components described above to provide for complete call center monitoring from the very first stage of the call to the final analytics.

Telephony

A first portion of telephony capabilities provided by exemplary embodiments may pertain to Correlation Reports. The PBX switch 38 may store a call record/log of telephony activity relating to one or more calls. In this regard, the processor 70 may contain a record of all call traffic that is sent to and from the recorder 36. Correlation Reports are one of the most important components in ensuring guaranteed recording, by way of comparing what the PBX switch 38 believes was sent to the recorder 36 with the actual calls that have been recorded. Employing Correlation Reports in the exemplary embodiments has two benefits.

Firstly, it provides confidence that the recorder 36 is reliably capturing the communications (e.g., telephone calls) that should be recorded are being recorded. Secondly, the exemplary embodiments (e.g., via processor 70, processor 104) have the ability to produce a daily report, displayed via display 85 (also referred to herein as an Insight display 85) or email notifications to one or more other devices (e.g., other apparatuses 50, network device 100) on the correlation between the PBX Switch 38 and recorder records of the recorder 36, highlighting any discrepancies. Additionally, the PBX Switch 38 may generate meta data that may be queried on the calls that were not recorded, or those displaying "To:," "From:," "Duration:," or "Time:," fields that can provide sufficient information for a user (e.g., customer) to determine the potential impact of this loss of data. Not all switches are inherently capable of issuing Correlation Reports, and thus the exemplary embodiments include compliant switches throughout. There is a limitation in traditional discrete program solutions that do not ensure compliance throughout the entire system and therefore are limited in the capabilities of their monitoring systems.

The telephony component 78 also provides information for analyzing Voice over IP ("VoIP") call metrics, including critical measures of performance such as jitter, latency, packet loss, and Mean Opinion Score. Should any of these metrics fall out of specification for the telephony switches, alarms may be generated by the processor 70 that feed back to the network device 100 (e.g., the call monitoring system 100). This allows for the system (e.g., the call monitoring system 100) to quickly detect and report any component of the call monitoring system that is not operating as required, and provides for the notification of this to facilitate quick repair and/or shifting the flow of telephony to avoid components that are not operating properly. Existing systems are limited and do not go on to monitor calls themselves, for instance.

Referring now to FIG. 4, an example flow chart is provided representing an example of a call metric being tested, and the generation of an alarm in cases where differences between recorded data and the switch call detail record are detected, preventing a problematic switch from propagating any issues. At operation 400, an apparatus (e.g., apparatus 50) may determine whether the recorder 36 is connected to the PBX switch 38. At operation 405, in an instance in which the recorder 36 is not connected to the PBX switch 38, an apparatus (e.g., apparatus 50) may generate a report (also referred to herein as an Insight report). This report may be provided by an apparatus (e.g., apparatus 50) to a network device (e.g., network device 100) indicating that the recorder 36 is not connected to the PBX switch 38. At operation 410, an apparatus (e.g., apparatus 50) may determine whether a call (e.g., a switch call) detail record differs from recorded data in response to determining that the recorder 36 is connected to the PBX switch 38.

At operation 415, an apparatus (e.g., apparatus 50) may generate an alarm (also referred to herein as an Insight alarm) in response to determining that the call detail record differs from the recorded data. In one example embodiment, an apparatus (e.g., apparatus 50) may send the alarm to a network device (e.g., network device 100). At operation 420, an apparatus (e.g., apparatus 50) may generate a report (e.g., an Insight report) in response to determining that the call detail record does not differ from the recorded data. The report may be a Correlation Report indicating that the call detail record does not differ from the recorded data. The report may be provided by an apparatus (e.g., apparatus 50) to a network device (e.g., network device 100).

Recording

The network device 100 is capable of monitoring multiple recorders (e.g., recorders 36 of various apparatuses 50) across multiple locations. In so doing, the recorder 36 may generate a myriad of alarms based on a variety of conditions, which are transferred to the network device (e.g., call monitoring system 100) if triggered. The network device 100 additionally may monitor all crucial elements of the recorder(s) (e.g., recorders 36 of the network 20 (also referred to herein as a recording system) including critical process usage and may generate an alarm(s) in an instance in which components (e.g., a processor (e.g., processor 70, central processing unit (CPU), etc.) and/or memory (e.g., memory device 76, memory 106)) exceeds a predefined threshold value.

Referring now to FIG. 5, a flow chart is provided demonstrating an example of the monitoring that occurs on the recorder itself and the generation of alarms to indicate a failing status on any of the metrics. At operation 500, an apparatus (e.g., apparatus 50) may determine that there are no abnormal changes in recorded volume. At operation 505, an apparatus (e.g., apparatus 50) may determine whether recorded processes are operational. At operation 510, an apparatus (e.g., apparatus 50) may determine whether recorded processes are operational and determine whether one or more components (e.g., a processor, CPU and/or memory device) exceeds an operational predetermined threshold value. At operation 515, an apparatus (e.g., apparatus 50) may generate a report (e.g., an Insight report) in response to determining that the recorded processes are operational and that one or more components (e.g., a processor (e.g., processor 70, a CPU, etc.) and/or a memory device (e.g., memory device 76, memory 106)) exceeds the operational predetermined threshold value. The alarm may be provided by the apparatus (e.g., apparatus 50) to a network device (e.g., network device 100). At operation 520, an apparatus (e.g., apparatus 50) may generate an alarm (e.g., an Insight alarm) in response to determining that the recorded processes are not operational and/or that the one or more components (e.g., processor, CPU and/or the memory device) do not exceed the operational predetermined threshold value. The alarm may be provided by the apparatus (e.g., apparatus 50) to a network device (e.g., network device 100).

The recorder of exemplary embodiments (e.g., recorder 36) may monitor recorder statuses and processes. Built into the recorder (e.g., recorder 36) of some exemplary embodiments, there may be over 300 alarms monitoring all aspects of the recorder's health, connections to telephony, processes, as well as many other metrics. The exemplary embodiments differ from the current spectrum of offerings in the field by way of the internal monitoring that is employed at the recorder. In addition to providing information about what error has arisen, or where an issue is spotted, the alarms may also provide information about how to resolve the issue(s) or the possible repercussions to the network device 100 (e.g., call monitoring system 100) as a result of the issue.

For instance, one such alarm is "the Recorder Call Store internal storage is nearly full. When the Recorder is full, recording will stop. Check that the Recorder is able to archive to removable or network storage devices," or "a channel did not detect any events for the specified period ('channel % cd-%hu'). Lack of events may indicate that a device is not set up correctly to record. Check the device is recording by making a test call." Generally, these alarms may be grouped in four major categories, such as Recording Activity, Archiving, System Health, and Licensing. In addition to these four major categories, the alarms may also be grouped into further minor categories for more in-depth monitoring, such as, for example, Users, Usage Reporting, and a Daily System Check that verifies that devices (e.g., apparatuses 50) are capable of being recorded. For instance, the recorder monitoring system 112 may keep measure on whether: a recorder's (e.g., one or more recorders 36) connection to a PBX switch (e.g., PBX switch 38) has been lost; that compared to last week at the same time there is a large difference in call recorder numbers; that a recorder(s) (e.g., recorder 36) is experiencing large packet loss; or that critical portions of call meta data are missing or corrupt, which can greatly jeopardize the quality of a call.

The monitoring of the exemplary embodiments surveys a recorder(s) itself, providing richer information and more powerful monitoring capabilities.

For instance, one of the greatest limits on call performance comes by the way of packet loss. By the recorder monitoring system 112 monitoring a recorder(s) (e.g., one or more recorders 36) for instances of particularly large packet loss, such as quantities in the thousands, large scale disruption to calls can be identified and avoided. Further, packet loss at large enough a scale can begin to result in loss to call metadata, such as call initialization data points, or call closure, leading to a recorder missing the genesis of a recording, or continuing to record after a call finishes. These pitfalls may be acceptable to current solutions. As more bandwidth intense activities become recorded more commonly, even low percentages of packet loss can result in catastrophic recording errors in HD audio or even HD video recordings. By utilizing the exemplary embodiments internal monitoring of a recorder(s) itself, rather than monitoring individual components that make up the recorder, these pitfalls can be identified and avoided by the exemplary embodiments, leading to higher quality and more consistent recordings, especially at levels of richer data content like video.

Archiving

The archiving component 114 may analyze whether a recorder(s) has successfully captured the recordings, either locally, or archived to Network Archive Storage (NAS). Furthermore, tests may be run by the archiving component 114 to ensure compliance with the recording parameters of a particular call center monitoring solution. The exemplary embodiments have the ability to monitor both a local data store (e.g., memory device 76) on the device (e.g., apparatus 50) that the recorder (e.g., recorder 36) is installed on, as well as a Network Archive Storage (NAS) device (e.g., memory 106) used to transfer call data for permanent archiving. This monitoring, by the archiving component 114 may check that there is sufficient space to hold the volume of recorder captured data. Additionally, the archiving component 114 may trigger an alarm(s) when retention policies indicate that data will be deleted before a configured retention policy expires.

As an example, one such criterion that is used is whether the data that has been recorded meets the retention policy, as indicated by the graphic user interface of FIG. 6.

Another criterion to be evaluated is whether a hard drive or other memory (e.g., memory device 76, memory 106) is becoming full, where the failure to identify this issue can result in the full stop of data recording capabilities, as indicated in the user interface of FIGS. 7.

Finally, one last example of a criterion on which the archiving component 114 is tested is whether the data that is being transferred from a recorder (e.g., recorder 36) to a NAS (e.g., memory 106) is being delayed, as demonstrated by the graph in FIG. 8.

These possible compliance and quality checks of the archiving process are demonstrated by the exemplary flow chart in FIG. 9 that illustrates the tests being run, and the generation of alarms for any potential failure states of these tests. At operation 900, an apparatus (e.g., network device 100) may determine whether local (e.g., memory device 76) or network storage space (e.g., a NAS device (e.g., memory 106)) is within an operational predetermined threshold. At operation 905, an apparatus (e.g., network device 100) may generate a report (e.g., an Insight report) in response to determining that local and/or network storage space is within the operational predetermined threshold. At operation 910, an apparatus (e.g., network device 100) may determine whether storage retention policies are being met. At operation 915, an apparatus (e.g., network device 100) may generate an alarm (e.g., an Insight alarm) in response to determining that storage retention policies are not being met and/or that a local storage and/or network storage space is not within an operational predetermined threshold. At operation 920, an apparatus (e.g., network device 100) may generate a report (e.g., an Insight report) in response to determining that storage retention policies are being met.

The particulars of recording, archiving, and monitoring audio data lacking in legacy solutions in particular makes legacy solutions unwieldy and less capable in the call center recording space. Furthermore, as these systems begin to take on higher levels of demand from rich-content data, such as HD audio and HD video, the legacy approach of pure network monitoring will become obsolete. Instead, the exemplary embodiments are designed to monitor the archiving component 114 from the perspective of audio from the outset, which allows it to be capable of handling the upcoming content-rich demands of modern systems.

Audio Quality of Recording ("QoR")

Once recordings are securely captured, the Quality of Recording component 115 may perform intelligent data sampling ensuring that the quality of recorded media is of the highest standard to facilitate effective investigations or dispute resolutions. To achieve this, the Quality of Recording component 115 may perform two functions on all or a configured subset of recordings. First, the Quality of Recording component 115 may check that the actual recorded audio is not silent. Second, the Quality of Recording component 115 may use wave form analysis to determine that what has been recorded is actual audio. Audio follows a particular wave form profile with segments of silence and variations in amplitude. So for example, in an instance in which the Quality of Recording component 115 detects that the majority of a call(s) contained no amplitude, then an alarm may be generated by the Quality of Recording component 115, with the Quality of Recording component 115 notifying, via a Web Console or email notification(s) (e.g., to one or more apparatuses 50), that a particular call(s) may have quality issues.

Given that these Quality of Recording (QoR) functionalities are developed with particularity to voice, further quality checks may also be performed by the Quality of Recording component 115, such as, for example, checking whether a recording is of sufficient quality for successful replay to support investigations or dispute resolutions. Since, metadata loss or packet loss may also have a particular strong effect on audio data, a key focus is placed on checking the quality of those metrics, as well as non-audio, silence, loudness, or other such anomalies in audio capture.

Furthermore, extended audio checks may be performed by the Quality of Recording component 115, such as integrating QoR with an audio analytics transcription. For example, using transcription a twelve digit number can be detected, which if Payment Card Industry (PCI) suppression is enabled may more than likely be a credit card number. When PCI suppression is invoked, the audio on a call associated with the digit number of a credit card may be suppressed (e.g., silenced) (for example, such that the entire credit card number may not be heard in some example embodiments). Thus, this second-level analytical analysis may lead to particular checks that would not otherwise be performed to ensure PCI suppression quality, and an alarm may be triggered by the Quality of Recording component 115 in the instance in which PCI is not being properly suppressed. Additionally, QoR checks may be extended to metadata, such as determining, via Quality of Recording component 115, whether a call recording(s) had audio but no accompanying metadata, or in the instance of recording social media information along with the call.

Referring now to FIG. 10, an exemplary flow chart is provided illustrating one possible testing criterion for Quality of Recording and an exemplary resulting alarm that may be triggered. At operation 1000, an apparatus (e.g., network device 100) may determine whether there is a Quality of Recording (QoR) issue with recorded media (e.g., a captured/recorded call). At operation 1005, an apparatus (e.g., network device 100) may generate an alarm (e.g., an Insight alarm) in response to determining that there is a QoR issue with the recorded media. At operation 1010, an apparatus (e.g., network device 100) may generate a report (e.g., an Insight report) in response to determining that there is no QoR issue with the recorded media. In an exemplary embodiment, this report may indicate that the recorded media passed a QoR check.

Most other systems are either not particularly designed for audio quality of recording, or they do not feed into a comprehensive end-to-end solution, and thus any checks are independent of any other function or component in the flow. Therefore, examples as described above, where characteristics gleaned from the analytics about PCI information generally are not achievable by existing systems since the PCI information typically cannot be fed back into a QoR step to ensure PCI compliance.

Quality of Network ("QoN")

The Quality of Network component 116 may analyze and monitor different aspects of network performance, which may affect the overall quality of recorded data. The exemplary embodiments provides testing of a variety of quality measurements to ensure critical network performance, which may be effected by a variety of networking related issues.

For instance, lack of sequence of packets may be monitored by the Quality of Network component 116. When a collection of related packets (e.g., packets of recorded telephone data) is routed through a network, different packets may take different routes, each resulting in a different delay. The result is that the packets arrive in a different order than they were sent. This problem requires special additional protocols responsible for rearranging out-of-order packets, via the Quality of Network component 116, to an isochronous state once they reach their destination. This is particularly important for video and VoIP streams where quality is dramatically affected by both latency and lack of sequence.

Furthermore, jitter may be monitored by the Quality of Network component 116. In this regard, packets (e.g., packets of recorded telephone data) from a source may reach a destination with different delays. A packet's delay varies with its position in the queues of the routers along the path between source and destination and this position can vary unpredictably. This variation in delay is known as jitter and may seriously affect the quality of streaming audio and/or video.

Additionally, latency may be monitored by the Quality of Network component 116. Regarding latency it may take a long time for each packet (e.g., packets of recorded telephone data) to reach its destination, because the packet(s) may get held up in long queues, or it takes a less direct route to avoid congestion. This is different from throughput, as the delay can build up over time, even if the throughput is almost normal. In some cases, excessive latency may render an application such as VoIP or online gaming unusable.

Moreover, network load trend analysis may be monitored by the Quality of Network component 116. In this regard, the Quality of Network component 116 may analyze network load on a recorder(s) (e.g., recorder 36) and understand at what particular load may cause packet loss and therefore probability of recorder (e.g., recorder 36) loss. The trend may be analyzed by the Quality of Network component 116 and if increasing to a predefined threshold, an alarm may be triggered by the Quality of Network component 116.

Referring now to FIG. 11, an exemplary user interface is provided according to an exemplary embodiment. In the example of FIG. 11, a quality of recording is detected in which at least one call recording (e.g., recorded via a recorder 36) is detected with no audio and a quality of recording alert is generated associated with start time and an end time of the corresponding call and a phone number extension (e.g., extension 1015) associated with the call. In the example of FIG. 11, eight alarms are also generated and indicated in the user interface 1100.

The monitoring of these various measurements of network quality is of imperative importance and particularity in the industry of call center recording, rendering many network monitoring solutions incapable of providing the necessary capabilities. As a result of the design and focus, by the exemplary embodiments, on voice and other rich content data, such as the focus on qualities such as "lack of sequence" or "network load trend" analyses, a more capable system is provided by the exemplary embodiments for the rigors of ensuring high quality network performance.

Referring now to FIG. 12, an exemplary flow chart is provided that illustrates one possible testing criterion for the Quality of Network component and an exemplary resulting alarm that may be triggered. At operation 1200, an apparatus (e.g., network device 100) may determine whether there is a Quality of Network (QoN) issue with recorded media (e.g., a captured/recorded call). At operation 1205, an apparatus (e.g., network device 100) may generate an alarm (e.g., an Insight alarm) in response to determining that there is a QoN issue with the recorded media. At operation 1210, an apparatus (e.g., network device 100) may generate a report (e.g., an Insight report) in response to determining that there is no QoN issue with the recorded media. In an exemplary embodiment, this report may indicate that the recorded media passed a QoN check.

As stated above, older systems would not be able to handle the demand of higher bandwidth needs, such as the network transfer of HD voice and video. The exemplary embodiments not only allows for these qualities to be monitored, but by integrating it into a full end-to-end system provides unparalleled quality assurances in the call center monitoring space.

Quality of Device ("QoD")

The Quality of Device component 118 may perform Daily System Checks ("DSC") to ensure that devices (e.g., apparatuses 50) that need to be recording are indeed recording (e.g., recording telephone calls). By monitoring all of the individual devices (e.g., apparatuses 50) in the same end-to-end system as the network (e.g., network 20) and the calls themselves, quality of the entire process can be ensured throughout the entire call process by the exemplary embodiments.

Referring now to FIG. 13, an example flow chart is provided illustrating one possible testing criterion for the Quality of Device component and an exemplary resulting alarm that may be triggered. At apparatus 1300, an apparatus (e.g., network device 100) may determine whether a Quality of Device component (e.g., Quality of Device component 118) detects a faulty device (e.g., a faulty apparatus 50). At operation 1305, an apparatus (e.g., network device 100) may generate an alarm (e.g., an Insight alarm) in response to determining that the device (e.g., apparatus 50) is a faulty device. Alarms are generated when a device is set as unavailable/available or when a device condition has exceeded a predefined threshold or set of thresholds as defined by a system administrator. At operation 1310, an apparatus (e.g., network device 100) may generate a report in response to determining that the device (e.g., apparatus 50) is not faulty. This report may indicate that the device passed one or more tests.

Analytics

With the seventh and final component of call center monitoring, i.e., analytics, a complete system must be capable of operating fully and the exemplary embodiments do so in a variety of mechanisms including: Transcription, Audio Search, Transcription Support, Word Cloud/Hot List Analytics, Real-time Analytics, Quality Manager, Multi-Channel Reporting, and Mobile Face-to-Face Transcription. These feature delivery mechanisms will each be discussed independently below, but the capabilities of including the analytics step in the exemplary embodiments allows for intelligent identification of qualities or characteristics of the call audio itself, and that information can be fed back into any component described above to create an adapting flow that learns from what is being stated on a call(s). By employing an advanced speech recognition engine of the exemplary embodiments, financial services investigations or call center dispute resolutions may be expedited by matching crucial keywords to the spoken segments within the call data. Voice data may be analyzed with a speech analytics engine 121 (also referred to herein as advanced speech recognition engine 121), transcribed into text and stored in a centralized database (e.g., memory 106). Through the exemplary embodiments, one or more users (e.g., customers) may have the ability to configure Hot List words/phrases, with the capability to raise alarms on matches via email, a user interface (e.g., user input interface 105) of a call center monitoring system (e.g., call monitoring system 100) or by way of Word Cloud technology. This may guarantee that what is being said/spoken during a call(s) does not pose any reputational or commercial risk by determining people's compliance to business ethics or best practices and alerting in real-time when discrepancies are found on what they have spoken. Some examples of these analytical tests can be seen in the flow charts described below that illustrate how different characteristics of a call itself may trigger different actions though the system (e.g., call monitoring system 100).

1. Transcription

The analytics device 120 may perform transcriptions which provides the ability to transcribe audio data to text and send the associated data to a data storage system or vault. As detailed below, audio export may be performed from the NAS storage (e.g., memory 106), using a specifically designed extraction broker which both import data and checks that it was successfully received by the storage system or vault. For textual transcriptions, the same mechanism may be used, by the analytics device 120, downloading transcriptions to NAS (e.g., memory 106) and then posting these to a storage system or vault, including, without limitation, to a service provider's vault as shown in the user interface 1400 of FIG. 14. The system (e.g., call monitoring system 100) also may be configured to provide the ability to set up hot lists of Instant Messages and audio to text transcriptions. In addition to the above transcription capabilities, call transcription may also be done directly from a recorder (e.g., recorder 36) as well as from a NAS (e.g., memory 106).

2. Audio Search

The analytics component 120 may perform audio search which allows a user(s) to search for specific words or phrases (e.g., Brexit, interest rate, etc.) and locate the words within the call playback, associated with a call recording, via a visual indicator. This functionality is shown in the user interface 1500 of FIG. 15. The audio search provides a user(s) the ability to put words and phrases into the system (e.g., call monitoring system 100) and return audio which matches the search parameters that includes text.

3. Transcription Support

The analytics device 120 may also provide the ability to show the actual audio to text transcriptions. As shown in the user interface 1600 of FIG. 16, the audio search feature described above may deliver the ability to search and retrieve audio matches to words and phrases. Transcription support may then additionally allow users to view (e.g., via a display 85) the actual text transcription (e.g. text transcriptions 1605) as shown in the user interface 1600.

4. Word Cloud/Hot List Analytics

The analytics device 120 may also give users the ability to set up one or more hot lists, which contain key words and/or phrases that the users would like to analyze if the words and/or phrases are uttered during an audio conversation (e.g., during a call). This hot list creation allows for the monitoring of matches that the user has designated important by inclusion on the hot list, and the visualization of these results in a Word Cloud is shown in the user interface 1700 of FIGS. 17.

For instance, in the example of FIG. 17, some words such as, for example, calling, morning, rings, origin, etc. were designated on the hot list and when these words are detected during a call (e.g., during a recorded call), the words may be flagged, as described more fully below.

For example, when the transcription of the call recording spots/identifies a word matching an entry on the hot list, two actions may be performed by the analytics device 120. First, an alarm may be generated, by the analytics device 120, and displayed on the user interface and if email is configured an email may be sent to an interested party (e.g., a user of an apparatus 50). Second, the Word Cloud may show (e.g., in a user interface (e.g., user interface 1700)) the appearance of a word(s) and/or phrase(s) if regularly uttered, for example, during a call, (e.g., based on a number of times the word(s) and/or phrase is detected), such that the word(s) and/or phrase(s) may grow (e.g., in size) graphically in prominence (e.g., the word "good" appears in greater prominence relative to some other words (e.g., "region, "origin", "time", etc.) in the user interface 1800 of FIG. 18). Additionally, in the user interface 1800 of FIG. 18, by clicking on a word (e.g., word 1805 (e.g., "good")) an audio file(s) (e.g., an audio file associated with a caller at extension 9187 and another party at extension 9287) associated with the word may be shown and the audio of the audio file may either be listened to or alternatively viewed/displayed in text (e.g., via a style messaging user interface (UI) format (e.g., an Apple' style messaging UI format)). Furthermore, as described below, the Hot List/Word Cloud capability may be seamlessly integrated into the Quality Manager capabilities of the system by providing a supervisor (e.g., of a call center agent) the ability to identify certain key words in a call flow within a hot list, and then monitor the performance of the call center agent by the reports generated in the Word Cloud and/or hot list alarms.

Some examples of analytical tests pertaining to the flow charts of FIGS. 19-20 are described below illustrating how different characteristics of a call itself may trigger different actions.

Referring now to FIG. 19, an example flow chart is provided according to an exemplary embodiment. At operation 1900, an apparatus (e.g., a network device 100) may determine whether a hot list word(s) and/or phrase(s) has been identified in a call(s) and/or a transcription of the call. At operation 1905, an apparatus (e.g., a network device 100) may generate a Word Cloud user interface (also referred to herein as Insight Word Cloud) including the word(s) and/or phrase(s) in response to determining that a hot list word(s) and/or phrase(s) has been identified in the call(s) and/or the transcription of the call. At operation 1910, an apparatus (e.g., a network device 100) may determine that the process ends in response to determining that a hot list word(s) and/or phrase(s) has not been identified in the call(s) and/or the transcription of the call.

Referring now to FIG. 20, another example flow chart is provided according to an exemplary embodiment. At operation 2000, an apparatus (e.g., a network device 100) may determine whether a Quality of Recording device (e.g., Quality of Recording component 115) detects an emotional issue in a call. In some example embodiments, the Quality of Recording device 115 may detect an emotional issue in a call in response to detecting that one or more parties (e.g., users) on the call speaks with a loud voice which is identified by analyzing the volume output observed in each channel and setting thresholds for acceptance (e.g., signifying yells, shouts, cries etc.). At operation 2005, an apparatus (e.g., a network device 100) may generate an alarm (e.g., an Insight alarm) in response to detecting an emotional issue associated with the call(s). At operation 2010, an apparatus (e.g., a network device 100) may determine that the process ends in response to determining that an emotional issue has not been detected in the call(s).

5. Real Time Analytics

Real time analytics may be employed by the analytics device 120 in parallel to a recorder (e.g., recorder 36), recording and storing the audio (e.g., audio associated with a call) within a local call store (e.g., memory device 76), with real time analytics simultaneously analyzing the audio data (e.g., call data). In essence, this works to employ the hot lists in real-time with the call data recording.

As an example of this, consider a trade (e.g., a stock trade) that is happening on a call that is being recorded. A crucial word (e.g., "numbers", etc.) may be spotted or identified (e.g., via analytics device 120) within the transaction, and as such a compliance officer may be notified and may have the ability to intercept the call, via a device (e.g., network device 100) and start either to listen or view the transcription (e.g., the transcription 2105 of the user interface 2100 of FIG. 21) of the call.

6. Quality Manager

Currently, when supervisors evaluate their agents within their respective teams, systems may provide them with a randomly generated list of calls as in the user interface 2200 of FIG. 22, with the ability to replay, evaluate (e.g., launch a Quality Manager (QM) interface) or reject (from an evaluation perspective) a call(s).

However, by using analytics, the Quality Manager device 122 (also referred to herein as Quality Manager 122) is able to compare any hot list words that were spoken (e.g., fraud, jail, etc.) during a call(s) and add these calls to a list that an agent's supervisor should assess. Furthermore, within the call center environment, the Quality Manager 122 may automatically assess an agent's compliance to one or more customer engagement scripts and may initiate an automatic evaluation. This may be done by the Quality Manager's 122 comparison of an engagement script that the agent should have complied with, against what was actually spoken during a call between communication devices (e.g., apparatuses 50) of the agent and a user (e.g., a customer). The network device 100 may also employ the Quality of Recording component 115 to determine whether a certain percentage of the call (e.g., the call between the agent and the user) was loud, or too quiet, and feed it back into a Quality Management report, generated by the Quality Manager 122, to indicate shouting by the user (e.g., the customer), in an example call with loud call portions (e.g., portions of the call that were loud). As such, the Quality Manager 122 may generate a targeted list of evaluations (e.g., of an agent(s)), as shown in the exemplary user interface 2300 of FIG. 23, to listen to or view the transcriptions (e.g., a faster approach to evaluating call data).

Referring now to FIG. 24, an example flow chart is provided according to an exemplary embodiment. At operation 2400, an apparatus (e.g., a network device 100) may determine whether an agent followed an engagement script during a call with a user (e.g., a customer). At operation 2405, an apparatus (e.g., a network device 100) may launch a call monitor (e.g., a call monitor user interface for a supervisor of the agent to listen and/or speak on the call or view a transcription of the call) in response to detecting that an agent did not follow the engagement script during the call with the user. At operation 2410, an apparatus (e.g., a network device 100) may determine that the process ends in response to determining that the agent followed the engagement script.

7. Multi-Channel Reporting

The Quality Manager 122 may perform Multi-Channel Reporting that allows the system (e.g., call monitoring system 100) to send alarms, alerts, and reports to devices of interested parties through a number of methods. For instance, real time health checking can be performed by the Quality Manager 122 across a variety of channels, such as a Web UI, e-mail, Simple Network Management Protocol (SNMP), and Rest Application Programming Interface (API), among others. This process ensures that the alarms and warning data can be distributed to a wide range of different formats. For instance, a user (e.g., a customer) may have their own particular suite of monitoring software and therefore compatibility with Rest API or SNMP may be required, and Multi-Channel Reporting allows the system to function properly. FIG. 25 demonstrates, in user interface 2500, various channels that the system (e.g., call monitoring system 100) is capable of reporting on.

8. Mobile Face-to-Face Transcription

Additionally, the Quality Manager 122 may facilitate Mobile Face-to-Face Transcription that allows the system (e.g., call monitoring system 100) to expand its recording and analytics capabilities to use mobile phones (e.g., apparatuses 50) to record face-to-face communications. In essence, a mobile phone may be used to record a face-to-face conversation with the recording being ingested into a recorder (e.g., recorder 36) and subsequently transcribed, allowing for yet further capabilities for the system (e.g., call monitoring system 100) to monitor the entirety of a call center's telephone interactions.

Referring now to FIG. 26, an example embodiment of a flow chart for monitoring one or more calls of a system is provided. At operation 2600, an apparatus (e.g., network device 100) may capture one or more recordings of telephone calls in real-time from corresponding recorder devices (e.g., recorders 36) of communication devices (e.g., apparatuses 50). At operation 2605, an apparatus (e.g., network device 100) may compare items of audio call data of the telephone calls detected by a switch (e.g., PBX switch 38) with the audio content of the recorded telephone calls recorded by one or more of the recorder devices (e.g., recorders 36) to determine whether the audio call data matches the audio content of the recorded telephone calls. The results of the comparison may be provided in a Correlation Report.

At operation 2610, an apparatus (e.g., network device 100) may monitor one or more conditions of the recorder devices (e.g., recorders 36) during the respective calls to determine whether at least one component of the recorder devices or at least one other component (e.g., processor 70, memory device 76, etc.) of the communication devices exceeds a predetermined threshold. At operation 2615, an apparatus (e.g., network device 100) may monitor at least one memory (e.g., memory 106) in which the recorded telephone calls are being transferred for permanent archiving to determine whether there is enough storage space in the memory (e.g., memory 106) to store the recorded telephone calls.

At operation 2620, an apparatus (e.g., network device 100) may determine a plurality of quality metrics impacting quality of the recorded telephone calls. At operation 2625, an apparatus (e.g., network device 100) may perform a plurality of analytics on the recorded telephone calls.

It should be pointed out that FIGS. 4, 5, 9, 10, 12, 13, 19, 20, 24 and 26 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (for example, memory device 76, memory 106) and executed by a processor (for example, processor 70, processor 104). As will be appreciated, any such computer program instructions may be loaded onto a computer or other programmable apparatus (for example, hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 4, 5, 9, 10, 12, 13, 19, 20, 24 and 26 above may comprise a processor (for example, the processor 70, processor 104, telephony component 78, recorder device 36, recorder monitoring system device 112, archiving component 114, Quality of Recording component 115, Quality of Network component 116, Quality of Device component 118, analytics device 120 and Quality Manager device 122) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing operations may comprise, for example, the processor 104 (for example, as means for performing any of the operations described above), the processor 70, the telephony component 78, recorder device 36, recorder monitoring system device 112, archiving component 114, Quality of Recording component 115, Quality of Network component 116, Quality of Device component 118, analytics device 120 and Quality Manager device 122 and/or a device or circuit for executing instructions or executing an algorithm for processing information as described above.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for monitoring one or more calls of a system comprising:
   capturing, via a processor of a network device, one or more recordings of telephone calls in real-time from corresponding recorder devices of communication devices;
   comparing, via the processor, items of audio call data of the telephone calls detected by a switch with the audio content of the recorded telephone calls recorded by one or more of the recorder devices to determine whether the audio call data matches the audio content of the recorded telephone calls;
   monitoring, via the processor, one or more conditions of the recorder devices during the respective calls to determine whether at least one component of the recorder devices or at least one other component of the communication devices exceeds a predetermined threshold;
   monitoring, via the processor, at least one memory device in which the recorded telephone calls are being transferred for permanent archiving to determine whether there is enough storage space in the memory device to store the recorded telephone calls;
   determining, via the processor, a plurality of quality metrics impacting quality of the recorded telephone calls; and
   performing, via the processor, a plurality of analytics on the recorded telephone calls.

2. The method of claim 1, further comprising:
   in response to determining that at least one the items of audio call data detected by the switch and a corresponding recorded telephone call does not match, receiving a generated alarm notifying the network device that there is an issue with the recorded telephone call.

3. The method of claim 1, further comprising:
   in response to determining that the at least one component of a respective recorder device exceeds the predetermined threshold determining at least one of (i) that a memory associated with the recorder device is full, (ii) whether a connection between the recorder device and the switch is lost, (iii) that the respective recorder device is experiencing packet loss, or (iv) that portions of call meta data, associated with a respective recorded telephone call, are missing or corrupt impacting quality of a corresponding telephone call.

4. The method of claim 1, wherein the at least one memory device comprises a Network Archive Storage (NAS) device and wherein the method further comprises:
   determining whether the recorded telephone calls being transferred to the at least one memory device, from respective memories associated with corresponding recorder devices, is being delayed.

5. The method of claim 1, further comprising:
   triggering generation of an alarm in an instance in which a retention policy denotes that the recorded telephone calls stored in the at least one memory device are to be deleted before the retention policy expires.

6. The method of claim 1, wherein one of the quality metrics corresponds to determining quality of the recorded telephone calls by sampling the audio content of the recorded telephone calls based in part on determining whether all or a subset of the audio content, satisfying a predefined threshold, of the recorded telephone calls is silent.

7. The method of claim 1, wherein one of the quality metrics corresponds to determining quality of network performance by analyzing at least one of received packet sequence, jitter, latency and whether a network load exceeds a predetermined threshold causing packet loss of at least a subset of the audio content of the recorded telephone calls.

8. The method of claim 1, wherein one of the quality metrics corresponds to determining a quality of the communication devices based in part on determining whether a respective communication device comprises a fault.

9. The method of claim 1, further comprising:
   performing the analytics based in part on determining, during a respective telephone call between at least two of the communication devices, whether at least one user of one of the communication devices followed an engagement script regarding a manner in which to interact with another user of another of the communication devices during the telephone call.

10. The method of claim 9, further comprising:
    triggering generation of an alarm in response to detecting that the at least one user did not follow the engagement script.

11. The method of claim 10, further comprising
    presenting a user interface to another communication device enabling another user of the another communication device to listen in, speak or view a transcription corresponding to audio associated with the telephone call, during the telephone call, in response to the detecting that the at least one user did not follow the engagement script.

12. The method of claim 1, further comprising:
    performing the analytics based in part on detecting one or more predefined words or phrases designated to be flagged in response to being spoken during a respective telephone call between communication devices of users.

13. The method of claim 12, further comprising:
    triggering generation of a user interface enabling a user to listen in during the call or view a transcription of the telephone call in response to detecting at least one of the predefined words or phrases.

14. The method of claim 13, further comprising:
    visibly denoting a size of the detected at least one predefined word or phrase in the user interface based in part on a number of times that the at least one predefined word or phrase is detected during the telephone call.

15. An apparatus for monitoring one or more calls of a system, the apparatus comprising at least one processor and at least one non-transitory memory including program code, the at least one non-transitory memory and the program code configured to, with the processor, cause the apparatus to at least:
capture one or more recordings of telephone calls in real-time from corresponding recorder devices of communication devices;
compare items of audio call data of the telephone calls detected by a switch with the audio content of the recorded telephone calls recorded by one or more of the recorder devices to determine whether the audio call data matches the audio content of the recorded telephone calls;
monitor one or more conditions of the recorder devices during the respective calls to determine whether at least one component of the recorder devices or at least one other component of the communication devices exceeds a predetermined threshold;
monitor the memory in which the recorded telephone calls are being transferred for permanent archiving to determine whether there is enough storage space in the memory to store the recorded telephone calls;
determine a plurality of quality metrics impacting quality of the recorded telephone calls; and
perform a plurality of analytics on the recorded telephone calls.

16. The apparatus of claim 15, wherein the memory including the program code is further configured to, with the processor, cause the apparatus to:
in response to determining that at least one the items of audio call data detected by the switch and a corresponding recorded telephone call does not match, receive a generated alarm notifying the apparatus that there is an issue with the recorded telephone call.

17. The apparatus of claim 15, wherein the memory including the program code is further configured to, with the processor, cause the apparatus to:
in response to determining that the at least one component of a respective recorder device exceeds the predetermined threshold, determine at least one of (i) that a memory associated with the recording device is full, (ii) whether a connection between the recorder device and the switch is lost, (iii) that the respective recorder device is experiencing packet loss, or (iv) that portions of call meta data, associated with a respective recorded telephone call, is missing or corrupt impacting quality of a corresponding telephone call.

18. The apparatus of claim 15, wherein the at least one memory device comprises a Network Archive Storage (NAS) device and wherein the memory including the program code is further configured to, with the processor, cause the apparatus to:
determine whether the recorded telephone calls being transferred to the memory, from respective memories associated with corresponding recorder devices, is being delayed.

19. The apparatus of claim 15, wherein the memory including the program code is further configured to, with the processor, cause the apparatus to:
trigger generation of an alarm in an instance in which a retention policy denotes that the recorded telephone calls stored in the memory are to be deleted before the retention policy expires.

20. The apparatus of claim 15, wherein one of the quality metrics corresponds to determining quality of the recorded telephone calls by sampling the audio content of the recorded telephone calls based in part on determining whether all or a subset of the audio content, satisfying a predefined threshold, of the recorded telephone calls is silent.

21. The apparatus of claim 15, wherein one of the quality metrics corresponds to determining quality of network performance by analyzing at least one of received packet sequence, jitter, latency and whether a network load exceeds a predetermined threshold causing packet loss of at least a subset of the audio content of the recorded telephone calls.

22. The apparatus of claim 15, wherein one of the quality metrics corresponds to determining a quality of the communication devices based in part on determining whether a respective communication device comprises a fault.

23. The apparatus of claim 15, wherein the memory including the program code is further configured to, with the processor, cause the apparatus to:
perform the analytics based in part on determining, during a respective telephone call between at least two of the communication devices, whether at least one user of one of the communication devices followed an engagement script regarding a manner in which to interact with another user of another of the communication devices during the telephone call.

24. The apparatus of claim 23, wherein the memory including the program code is further configured to, with the processor, cause the apparatus to:
trigger generation of an alarm in response to detecting that the at least one user did not follow the engagement script.

25. The apparatus of claim 24, wherein the memory including the program code is further configured to, with the processor, cause the apparatus to:
present a user interface to another communication device enabling another user of the another communication device to listen in, speak or view a transcription corresponding to audio associated with the telephone call, during the telephone call, in response to the detecting that the at least one user did not follow the engagement script.

26. The apparatus of claim 15, wherein the memory including the program code is further configured to, with the processor, cause the apparatus to:
perform the analytics based in part on detecting one or more predefined words or phrases designated to be flagged in response to being spoken during a respective telephone call between communication devices of users.

27. The apparatus of claim 26, wherein the memory including the program code is further configured to, with the processor, cause the apparatus to:
trigger generation of a user interface enabling a user to listen in during the call or view a transcription of the telephone call in response to detecting at least one of the predefined words or phrases.

28. The apparatus of claim 27, wherein the memory including the program code is further configured to, with the processor, cause the apparatus to:
visibly denote a size of the detected at least one predefined word or phrase in the user interface based in part on a number of times that the at least one predefined word or phrase is detected during the telephone call.

29. A computer program product for monitoring one or more calls of a system, the computer program product comprising at least one non-transitory computer-readable storage medium having computer-executable program code instructions stored therein, the computer-executable program code instructions comprising:

program code instructions configured to capture one or more recordings of telephone calls in real-time from corresponding recorder devices of communication devices;

program code instructions configured to compare items of audio call data of the telephone calls detected by a switch with the audio content of the recorded telephone calls recorded by one or more of the recorder devices to determine whether the audio call data matches the audio content of the recorded telephone calls;

program code instructions configured to monitor one or more conditions of the recorder devices during the respective calls to determine whether at least one component of the recorder devices or at least one other component of the communication devices exceeds a predetermined threshold;

program code instructions configured to monitor a memory of a network device in which the recorded telephone calls are being transferred for permanent archiving to determine whether there is enough storage space in the memory to store the recorded telephone calls;

program code instructions configured to determine a plurality of quality metrics impacting quality of the recorded telephone calls; and program code instructions configured to perform a plurality of analytics on the recorded telephone calls.

30. The computer program product of claim 29, further comprising:

program code instructions configured to, in response to determining that at least one the items of audio call data detected by the switch and a corresponding recorded telephone call does not match, cause receipt of a generated alarm notifying the network device that there is an issue with the recorded telephone call.

* * * * *